US012035799B2

(12) United States Patent
Haughton

(10) Patent No.: US 12,035,799 B2
(45) Date of Patent: Jul. 16, 2024

(54) KNIFE SHEATH ADAPTERS, SYSTEMS AND METHODS

(71) Applicant: Carpediem Group, LLC, Columbus, OH (US)

(72) Inventor: Barrie Haughton, Columbus, OH (US)

( * ) Notice: Subject to any disclaimer, the term of this patent is extended or adjusted under 35 U.S.C. 154(b) by 0 days.

(21) Appl. No.: 17/744,029

(22) Filed: May 13, 2022

(65) Prior Publication Data

US 2023/0363519 A1    Nov. 16, 2023

(51) Int. Cl.
*A45F 5/02* (2006.01)
*A45F 5/14* (2006.01)
*B26B 29/02* (2006.01)

(52) U.S. Cl.
CPC ................ *A45F 5/021* (2013.01); *A45F 5/14* (2013.01); *B26B 29/025* (2013.01)

(58) Field of Classification Search
CPC .......... A45F 5/021; A45F 5/14; B26B 29/025; B26B 29/02; F41C 33/046; F41C 33/041
USPC .................................................. 224/581–583
See application file for complete search history.

(56) References Cited

U.S. PATENT DOCUMENTS

| | | | | |
|---|---|---|---|---|
| 3,631,994 A * | 1/1972 | Mackzum, Jr. | A45F 5/02 | 224/678 |
| 4,759,483 A * | 7/1988 | Willoughby | F41C 33/045 | 224/672 |
| 10,477,949 B2 * | 11/2019 | Wall | A45F 5/021 | |
| 2010/0176174 A1 * | 7/2010 | Felts | F42B 39/02 | 224/676 |
| 2010/0294822 A1 * | 11/2010 | Haight | F41C 33/041 | 224/666 |
| 2017/0043493 A1 * | 2/2017 | Seber | B26B 29/025 | |

* cited by examiner

*Primary Examiner* — Adam J Waggenspack

(57) ABSTRACT

New devices, methods and systems for stowing and carrying knives, and, in particular, to adapting knife sheaths to fit in different ways when worn and carried by a user, are provided. In some aspects, specialized knife sheaths and knife sheath adapters are provided, allowing a user to change the angle and orientation of a knife when stored on or about a user's body. In some embodiments, such knife sheath adapters include both belt-mounting and sheath-mounting hardware, configured to mount onto a belt and a sheath simultaneously. In some embodiments, such a knife sheath adapter is configured to allow a user to carry a knife and sheath in a wide variety of configurations and orientations, according to a user's preference.

20 Claims, 12 Drawing Sheets

KNIFE SHEATH ADAPTERS, SYSTEMS AND METHODS

FIELD OF THE INVENTION

The present invention relates to devices, methods and systems for stowing and carrying knives, and, in particular, to adapting knife sheaths to fit in different ways when worn by a user.

BACKGROUND

Knives, swords and other cutlery have been in use since before recorded history. Early humans during the Stone Age learned to hammer certain rocks, such as flint, producing flakes with long, sharp edges, and used them as blades. Much stronger blades forged from metal followed during the Copper, Bronze and Iron Ages, changing the course of human history in all important areas of endeavor, including hunting, war, medicine, culinary arts, manufacturing and craft work.

For hundreds of years, at least some knives have included some or all of the following additional refinements:

A "handle," which, as used in this application, means a part of a knife connected or integral with a blade of the knife, configured to be held by a user (e.g., by hand) allowing the user to more safely manipulate the blade.

A "grip," which, as used in this application, means a material, structure and/or texture forming an outer surface of a knife's handle, to enhance friction or otherwise improve a user's ability to hold the knife's handle and/or the knife.

A "lanyard," which, as used in this application, means a strap, cord or other material attached to a knife (e.g., for retaining control over the knife, such as by wrapping around a user's wrist).

A "lanyard mounting hole," which, as used in this application, means a port within a knife for threading and mounting a knife lanyard.

A "hilt," which, as used in this application, means a guard formed from on or about an end of a knife handle facing a blade attached to or integral with the handle.

A "grind," which, as used in this application, means a cross-sectional shape of the blade of a knife (when sectioned on a plane perpendicular to the length of the blade).

A "point," which, as used in this application, means a sharp tip of a blade of a knife.

A "tang," which, as used in this application, means a portion of a blade of a knife which extends into the handle.

An "blade edge," which, as used in this application, means a sharpened side or other area of a knife blade.

A "wedge-shaped blade edge," which, as used in this application, means flat edge with bilateral symmetry about a plane through a knife blade edge, bisecting a knife blade.

A "scale" which, as used in this application, means a piece of material(s) forming a part of a knife handle, other than a fastener joining the piece of material(s) to the remainder of the knife, if such a fastener is present.

Because knives are sharp, they present dangers for users, even when not in use. Users can inadvertently cut themselves in a number of ways, including lacerations from sitting on knives, or reaching into pockets or tool boxes containing knives. At least since the medieval Europe, belt-mounted sheaths, covering the blades of the knives, have been commonly used to carry knives more safely. Sheathes may be made from a wide variety of strong protective materials, such as plastics, metal, carbon fiber and even cloth. Also due to its dangers, the legality of carrying knives is heavily regulated and varies confusingly from jurisdiction to jurisdiction, and often within one jurisdiction. For example, some laws require that certain small knives considered to be "daggers" or "dirks," be carried by a person in plain view, while also providing guidance that knives below 4 inches may be concealed. While carrying all knives in a conspicuous manner may be suggested, the same jurisdictions criminalize the "threatening" display knives, and it is widely understood that carrying displayed knives make arrest more, not less, likely, because the possession of knives is naturally associated by police with crime and violence, and, in any event, many police officers may not understand the unclear, conflicted nuances of laws regarding knife carrying and display. For example, guidance on what types of display are considered "threatening," and what knives are considered a "dagger" or a "dirk" is limited and unclear. Many other solutions for carrying and storage, such as pocket knives, are far more commonly used today than fixed-length knives carried on belt-mounted sheaths.

It should be understood that the disclosures in this application related to the background of the invention, in, but not limited to this section titled "Background," do not necessarily set forth prior art or other known aspects exclusively, and may instead include art that was invented concurrently or after the present invention and conception, and details of the inventor's own discoveries and work and work results.

SUMMARY OF THE INVENTION

New devices, methods and systems for stowing and carrying knives, and, in particular, to adapting knife sheaths to fit in different ways when worn and carried by a user, are provided. In some aspects, specialized knife sheaths and knife sheath adapters are provided, allowing a user to change the angle and orientation of a knife when stored on or about a user's body.

For example, in some embodiments, a knife sheath adapter is provided for carrying both a knife and a sheath configured for belt-mounting (on a belt worn around the waist of a user). In some embodiments, such a knife sheath adapter includes both belt-mounting and sheath-mounting hardware (e.g., in the form of specialized bands disposed on opposite sides of the knife sheath adapter). In some such embodiments, such belt-mounting hardware and sheath-mounting hardware are configured to engage a belt and a sheath, respectively, and simultaneously hold such a belt and sheath in a parallel, or substantially parallel, orientation relative to one another. Nonetheless, in some embodiments, such a specialized sheath is configured to be directly mounted on such a belt in a perpendicular orientation, relative to such a belt, without the use of such an adapter. In some embodiments, such sheath-mounting hardware can be fastened and unfastened to such a sheath by reversible fastening hardware. For example, in some such embodiments, such sheath mounting hardware may include a plurality of straps, one or more of which may be configured to be opened and closed by such reversible fastening hardware. In some embodiments, such reversible fastening hardware may include snaps (e.g., metal, such as stainless steel and/or metal alloy snaps). In some embodiments, such reversible fastening hardware may include buckles. In some embodiments, such reversible fastening hardware may include magnets. In some embodiments, such reversible fastening hardware may include clip(s). However, in some embodiments, one or more of such straps may be more permanently closed and fastened.

In some example embodiments of methods in accordance with the present application, a user may be provided with a knife stored in a sheath, each being configured to be mounted on a belt around the user's waist in a perpendicular orientation relative to the length of the belt. In some such embodiments, such a sheath, and knife held within it, are configured to be directly mounted on such a belt in a perpendicular orientation relative to such a belt. For example, in some embodiments, such a sheath includes belt-coupling hardware, such as an end loop, configured to accept a length of a belt in a direction generally and/or substantially perpendicular in direction to a length of the sheath and knife. In some embodiments, the user may also be provided with knife sheath adapter, configured to be coupled with the knife sheath, and including belt-mounting hardware, configured to be mounted on a length of a belt. In some such embodiments, such knife sheath adapter is configured to simultaneously hold such a belt and sheath in a parallel, or substantially parallel, orientation relative to one another. In some embodiments, such a knife sheath adapter is coupled to the sheath in a direction generally and/or substantially parallel in direction to a length of the sheath (and a knife held within the sheath). However, in some embodiments, such a knife sheath adapter may be worn in multiple orientations and directions on or about belts, whether or not those belts are presently worn on the user's body. In various embodiments, such a knife, knife sheath and knife sheath adapter, may include any of the knives, knife sheaths and/or knife sheath adapters set forth herein, in the present application, as will be discussed in greater detail below.

CANONS OF CONSTRUCTION

Where any term is set forth in a sentence, clause or statement ("statement") in this application, each possible meaning, significance and/or sense of any term used in this application should be read as if separately, conjunctively and/or alternatively set forth in additional statement(s), after the sentence, clause or statement, as necessary to exhaust the possible meanings of each such term and each such statement.

It should also be understood that, for convenience and readability, this application may set forth particular pronouns and other linguistic qualifiers of various specific gender and number, but, where this occurs, all other logically possible gender and number alternatives should also be read in as both conjunctive and alternative statements, as if equally, separately set forth therein.

The embodiments set forth in detail in this application are to ease the reader's understanding of inventions set forth herein and, as such, are only examples of the virtually innumerable number of alternative embodiments falling within the scope of the application. No specific embodiment set forth in this application should be read as limiting the scope of any claimed inventions.

These and other aspects of the invention will be made clearer below, in other parts of this application. This Summary, the Abstract, and other parts of the application, are for ease of understanding only, and no part of this application should be read to limit the scope of the invention, whether or not it references matter also set forth in any other part.

BRIEF DESCRIPTION OF THE DRAWINGS

The features and advantages of example embodiments of the inventions presented herein will become more apparent from the detailed description set forth below when taken in conjunction with the following drawings.

DETAILED DESCRIPTION OF THE INVENTION

The example embodiments of the invention presented herein are directed to new devices, methods and systems for stowing and carrying knives, and, in particular, to adapting knife sheaths to fit in different ways when worn and carried, which are now described herein. This description is not intended to limit the application to the embodiments presented herein, which are only examples of the virtually unlimited possible embodiments falling within the scope of the present application. In fact, after reading the following description, it will be apparent to one skilled in the relevant art(s) how to implement the following example embodiments in alternative embodiments, including any possible order, number, combination or other arrangement of any or all aspects, components, sub-components and/or relationships thereof (e.g., similar carrying adapters mounted on different belts in other contexts, such as on luggage or automobiles, and mounting on multiple belts). The following order, number, combination or other arrangement of aspects, components, sub-components and/or relationships are non-limiting.

Figure 1:
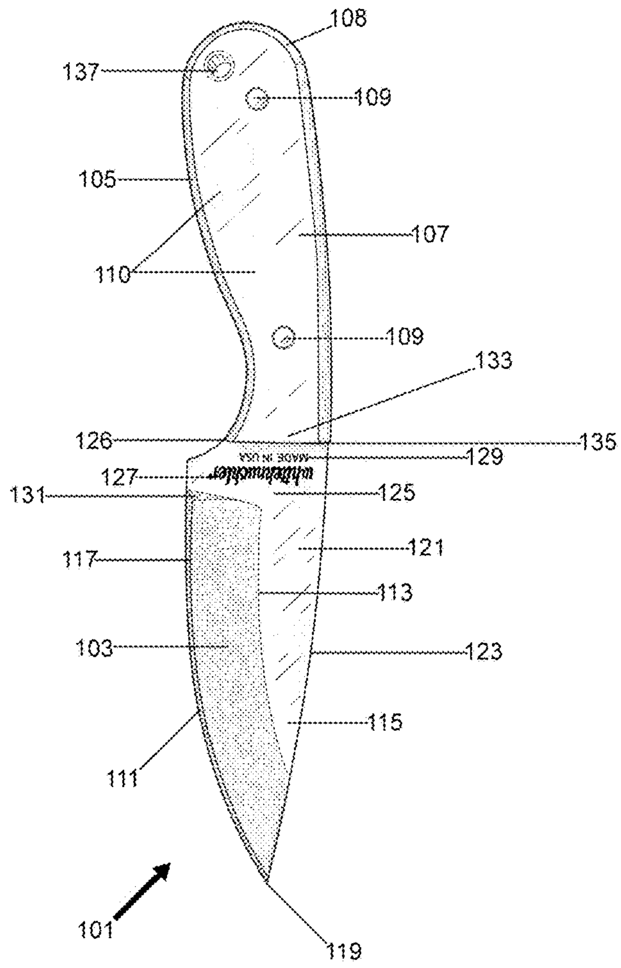
FIG. 1 is a side view of an example knife, in accordance with some aspects of the present application.

FIG. 1 is a side view of an example knife 101, in accordance with some aspects of the present application. In some embodiments, example knife 101 includes a blade 103, which, in some such embodiments, may be integral with an example tang (not pictured in the present figure) extending into a handle 105. In some embodiments, handle 105 includes one or more scales, such as example right-side scale 107, which may be integral with or fastened to the remainder of knife 101 (e.g., with a fastener(s), such as example rivets 109, and/or one or more a pin(s), screw(s), nail(s), bolt(s) or other mechanical fastener(s) and/or connector(s)). In some embodiments, scale 107 may include rounded and/or beveled edges 108. However, in some embodiments, such corner edges may have a different exterior shape (e.g., rounded). In any event, scale 107 may be flattened, at least in a main exterior side area 110, in some embodiments. In some embodiments, such scales and/or such a handle may include a grip, lining, treatment, texture, rubberization, coating and/or other surface feature forming the exterior surface of the scales and/or handle 105 (such as example grip texture 1211, shown below, in FIG. 12, for example).

In various embodiments, knife 101 may be constructed from any known, suitable material for making knives known in the art. For example, in some embodiments, blade 103 may be constructed from a metal and/or metal alloy. In some such embodiments, blade 103 may be constructed from stainless steel. In some such embodiments, blade 103 may be constructed from D2 steel, sourced from the United States.

In some embodiments, knife 101 includes a sharpened blade edge 111, which, in some embodiments, may be a wedge-shaped blade edge, formed from a wedge-shaped blade. In some such embodiments, a slope of such a wedge-shaped blade may originate along a line 113 on an outer surface 115 of blade 103, and continuing toward sharpened blade edge 111 (from right to left, in the perspective of the figure). In some embodiments, the slope of the wedge-shaped blade may be complex, including a more oblique wedge angle with a flatter slope, e.g., beginning at an outer surface line 117, and continuing toward sharpened blade edge 111, than a more acute wedge angle across the area between line 113 and outer surface line 117, also included in the blade 103. In some embodiments, the wedge-shaped blade edge 111 forms a part of a sharpened tip 119 of blade 103 (and knife 101). In an unsharpened, supporting region 121, however, the right side of blade 103 (facing the viewer) is generally flat, in some embodiments, meaning that the outer surface of supporting region 121 is perpendicular to the angle of view in FIG. 1, of blade 103, on the right-hand side of blade 103. Similarly, a back side 123 of blade 101, on a side opposite from blade edge 111, is preferably generally flat and blunt, in some embodiments, allowing a user to place her or his thumb against the back side 123 of blade 101 without cutting her or his hand. In some embodiments, another, base supporting region 125, at a base 126 of blade 103, is also generally flat, like supporting region 121, and base supporting region 125's outer surface is also perpendicular to the viewing angle in FIG. 1, of blade 103, in some embodiments. In some embodiments, branding 127 or other informational indicators (such as country of origin indicator 129) may be provided, e.g., on or about base supporting region 125. However, in some embodiments, branding or such indicators may be provided elsewhere, on, in or throughout knife 101, as an alternative, or in addition to, the locations pictured. In some embodiments, a sloped transition area 131 may be provided, between base supporting region 125 and the wedge-shaped blade.

In some embodiments, a hilt 133 may be provided, at or about the base supporting region 125, where it abuts handle 105, in some embodiments. In some embodiments, hilt 133 may be formed by a part (e.g., a flat edge 135) of scale 107. However, in some embodiments, a separate or other part may form such a hilt or other guard, protecting a user's hand during cutting and thrusting movements using knife 101.

In some embodiments, a lanyard mounting hole 137 may be provided, through which a lanyard (not pictured) may be threaded and/or mounted, in some embodiments.

Figure 2:
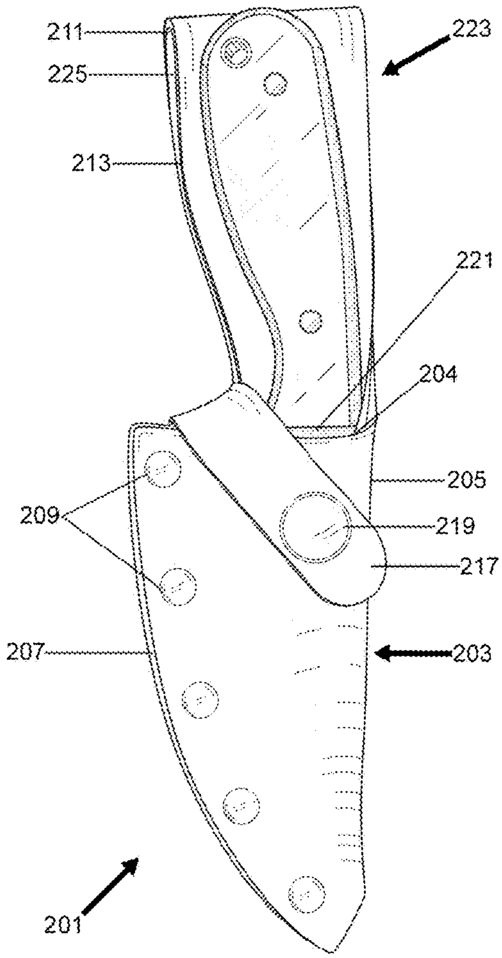
FIG. 2 is a side view of the same example knife as set forth above, in reference to FIG. 1, stowed in a sheath configured to be mounted on a belt, in accordance with some aspects of the present application.

FIG. 2 is a side view of the same example knife 101, as set forth above, in reference to FIG. 1, stowed in a sheath 201, configured to be mounted on a belt, in accordance with some aspects of the present application. As pictured, the blade 103 has been inserted into a pocket section 203 of sheath 201, including a pocket 204, protecting users from cutting injuries from blade 103 when so stowed. In some embodiments, sheath 201 may include any suitable material for knife sheaths such as, but not limited to, leather, plastics, metals, fabrics, carbon fiber and/or KEVLAR. In some embodiments, pocket section 203 and sheath 201 may be constructed from leather, and one or more metal fastener(s). However, in some embodiments, pocket section 203 and sheath 201 may be constructed, at least in part, using adhesives and/or stitching, instead of, or in addition to, such fastener(s). For example, as pictured, sheath 201 may be constructed from one or more plies of leather, folded at a folded side 205, and fastened together (and/or onto itself), at a tail side 207, by metal (e.g., stainless steel) fasteners, such as example rivets 209.

In some embodiments, belt-mounting hardware is included sheath 201, such as example upper belt loop 211. In some embodiments, upper belt loop 211 is also constructed from one or more plies of leather, such as example loop ply 213, and one or more metal fastener(s), such as example loop-forming rivet (not pictured in the present figure, but pictured below as loop-forming rivet 2308).

In some embodiments, sheath 201 may include a knife-retaining stay or band, such as example reversibly fastenable strap 217. In some embodiments, fastenable strap 217 includes at least part of a reversible fastener, such as example snap 219 (part of which fastener is also present on pocket section 203 (not visible in the present figure). In some embodiments, reversibly fastenable strap 217, when fastened, wraps around and holds part of a hilt or other edge 221 of blade 103, retaining it within pocket 204. In such embodiments, reversibly fastenable strap 217, when so fastened, serves as a safety, preventing the inadvertent release and exposure of blade 103, which might otherwise cause accidental injuries to the user or others.

In some embodiments, a user may insert blade 103 into pocket 104 of sheath 201, and then wrap and fasten fastenable strap 217 around hilt or other edge 221 of blade 103, coupling knife 101 and sheath 201, forming a knife and sheath set 223 for safe traveling. In some such embodiments, a user may then (or earlier) thread a belt or strap (e.g., a belt placed about the user's waist) through a hole 225 of upper belt loop 211, fasten the belt or strap, closing it, and travel with the knife and sheath set 223. Generally speaking, sheath 201 is configured to be directly mounted on such a belt in a perpendicular orientation, relative to such a belt. Thus, when worn on a user's belt drawn about his or her waist, sheath 201 will generally run lengthwise in a direction parallel to his or her leg, as will be demonstrated and discussed below.

Figure 3:
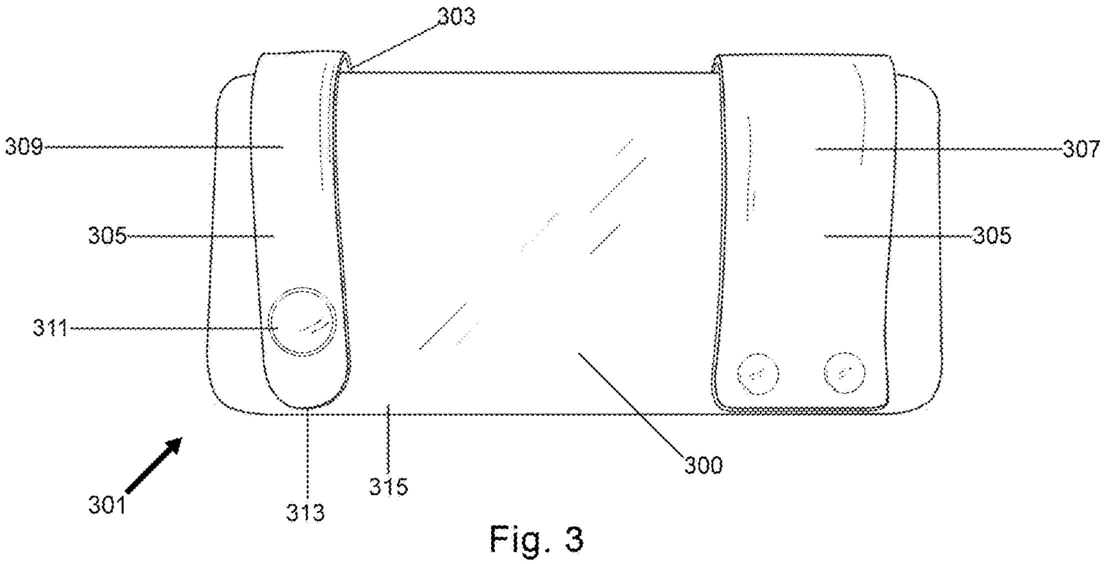
FIG. 3 is a side view of an example knife sheath adapter, configured to be coupled with a knife sheath, such as the knife sheath set forth above, in reference to FIG. 2, above, in accordance with some embodiments of the present application.

FIG. 3 is a front side view of an example knife sheath adapter 301, configured to be coupled with a knife sheath, such as the knife sheath 201, set forth above, in reference to FIG. 2, in accordance with some embodiments of the present application. In some embodiments, a knife sheath adapter such as example knife sheath adapter 301 is configured for carrying both: A) a knife (e.g., example knife 101), and B) a sheath (e.g., example sheath 201) configured for belt-mounting (on a belt worn around the waist of a user) holding such a knife.

In some embodiments, such a knife sheath adapter includes both belt-mounting hardware 303, and sheath-mounting hardware 305. For example, in some embodiments, belt-mounting hardware includes one or more (e.g., fixed) loops of material (not pictured in FIG. 3), configured to engage with a belt, which may be threaded through such loops, and then closed, to hold the knife sheath adapter 301, mounting it in place about the user's waist. Generally speaking, when so mounted, the length of knife sheath adapter 301 is held in a parallel orientation relative to the user's belt, as will be shown in greater detail below.

On the front side 300 of knife sheath adapter 301 facing a viewer of FIG. 3, example sheath mounting hardware 305 is visible, and may include one or more straps, such as example sheath pocket section holding strap 307, and example belt loop engaging strap 309. In some embodiments, such sheath-mounting hardware can be fastened and unfastened to such a sheath by reversible fastening hardware. For example, in some embodiments, at least belt loop engaging strap 309 includes reversible fastener, such as example snap 311 (at least part of which may be present on example belt loop engaging strap 309). However, in some embodiments, any reversible fastener known in the art, and suitable for attaching and detaching the ends of straps, and/or opening and closing loops and straps, may be used, alternatively or in addition to example snap 311, to attach and detach an end 313 of example belt loop engaging strap 309 from a main body 315 of example knife sheath adapter 301.

In any event, after first placing a pocket section of such a sheath through pocket section holding strap 307, and using such a reversible fastener of example belt loop engaging strap 309, a user may open example belt loop engaging strap 309, and thread end 313 through belt-mounting hardware of a knife sheath, such as example upper belt loop 211, and then close example belt loop engaging strap 309, fastening such a reversible fastener, holding and locking the sheath, in a mounted position, on knife sheath adapter 301. The user may then thread her or his belt or strap (e.g., a waist belt) through the belt-mounting hardware (not pictured in the present figure) and mount both the knife sheath adapter 301, a knife sheath mounted within it, and a knife within the knife sheath, on her or his belt or strap, transporting it as a set. Also, at least in some embodiments (e.g, when knife sheath adapter 301 is mounted on a waist belt about the waist of a user), belt-mounting hardware and sheath-mounting hardware of a knife sheath adapter 301 are configured to engage a belt and a sheath, respectively, and simultaneously hold such a belt and sheath, and a knife within the sheath, in a parallel, or substantially parallel, orientation relative to one another. In other words, in some embodiments, knife sheath adapter 301 is configured to hold a knife sheath and knife in a parallel orientation relative to a waist belt and the user's waistline, and in an opposite orientation that when is used to directly couple such a knife sheath to such a waist belt (ordinarily, a perpendicular orientation). Because the knife sheath adapter 301 is also held in a parallel configuration relative to such a waist belt, all three components (the knife, knife sheath, and knife sheath adapter 301, a.k.a., a knife, knife sheath, and knife sheath adapter set) are simultaneously mounted, each and all in parallel on a user's belt. Of course, an owner of the set may still opt to use and mount any of the sheath or sheath adapter, separately, on or about her or his waist on her or his waist belt, in some embodiments.

In some embodiments, a user may directly mount a knife onto such a knife sheath adapter (preferably, with a tightenable version of sheath mounting hardware 305, such as a version of sheath pocket section holding strap, and/or belt loop engaging strap 309, that may be lengthened or shortened with length-adjustment hardware.

Figure 4:
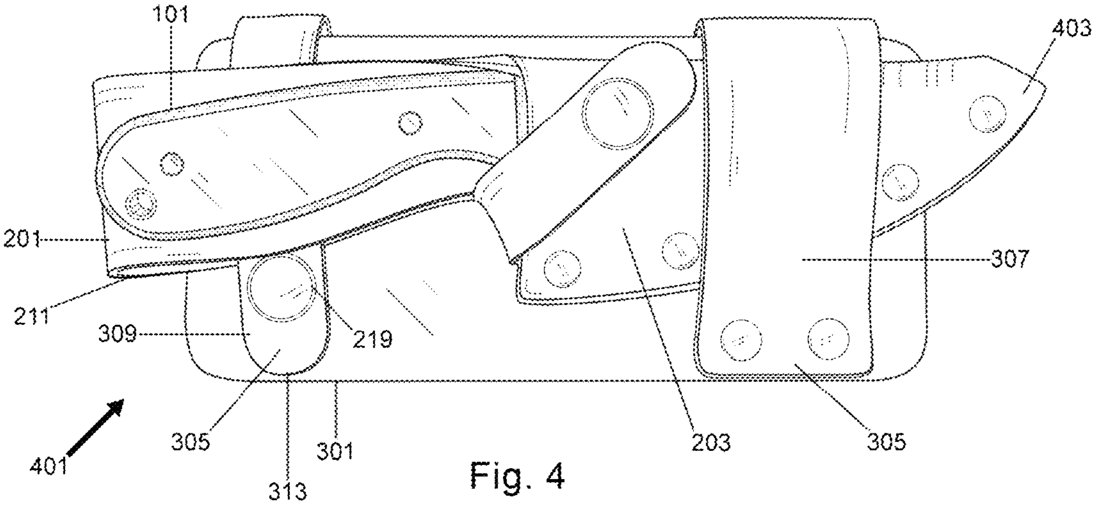
FIG. 4 is a front side view of belt-mounting set configured to orient a knife sheath and knife in a parallel configuration relative to a belt, which set includes the same example knife sheath adapter as set forth above, in reference to FIG. 3, coupled to the same example knife sheath holding the same example knife set forth above, in reference to FIGS. 1 and 2, in accordance with some embodiments of the present application.

FIG. 4 is a side view of belt-mounting set 401 configured to orient a knife sheath and knife in a parallel configuration relative to a belt, which set includes the same example knife sheath adapter 301 as set forth above, in reference to FIG. 3, coupled to the same example knife sheath 201, holding the same example knife 101, set forth above, in reference to FIGS. 1 and 2, in accordance with some embodiments of the present application. In this figure, knife sheath adapter 301 is again shown in the same front side perspective as pictured above, in FIG. 3—namely, a front side perspective again showing example sheath mounting hardware 305.

As discussed above, in some embodiments, sheath mounting hardware 305 may include one or more straps, such as example sheath pocket section holding strap 307, and example belt loop engaging strap 309. And as also suggested above, in reference to FIG. 3, in the now-pictured embodiments, after first threading a pocket tip 403 of pocket section 203 of knife sheath 201 through pocket section holding strap 307, and opening a reversible fastener (e.g., snap 219) of example belt loop engaging strap 309, a user has now opened example belt loop engaging strap 309, and threaded end 313 through belt-mounting hardware of a knife sheath, namely, example upper belt loop 211, and then closed example belt loop engaging strap 309, fastening such a reversible fastener, now holding and locking sheath 201 in a mounted position on knife sheath adapter 301.

The user may next thread her or his belt or strap (e.g., a waist belt) through the belt-mounting hardware (not fully pictured in the perspective of the present figure) and mount the entire set, including the knife sheath adapter 301, knife sheath 201 mounted within it, and knife 101 within the knife sheath 201, on the belt or strap, transporting it as a set. Thus, also as suggested above, at least in some embodiments (e.g, when knife sheath adapter 301 is mounted on a waist belt about the waist of a user), belt-mounting hardware and sheath-mounting hardware of a knife sheath adapter 301 are configured to engage a belt and a sheath, respectively, and simultaneously hold such a belt and sheath, and a knife within the sheath, in a parallel, or substantially parallel, orientation relative to one another. Examples of such embodiments and methods will be set forth and shown further below, for example, in reference to FIG. 8.

Figure 5:
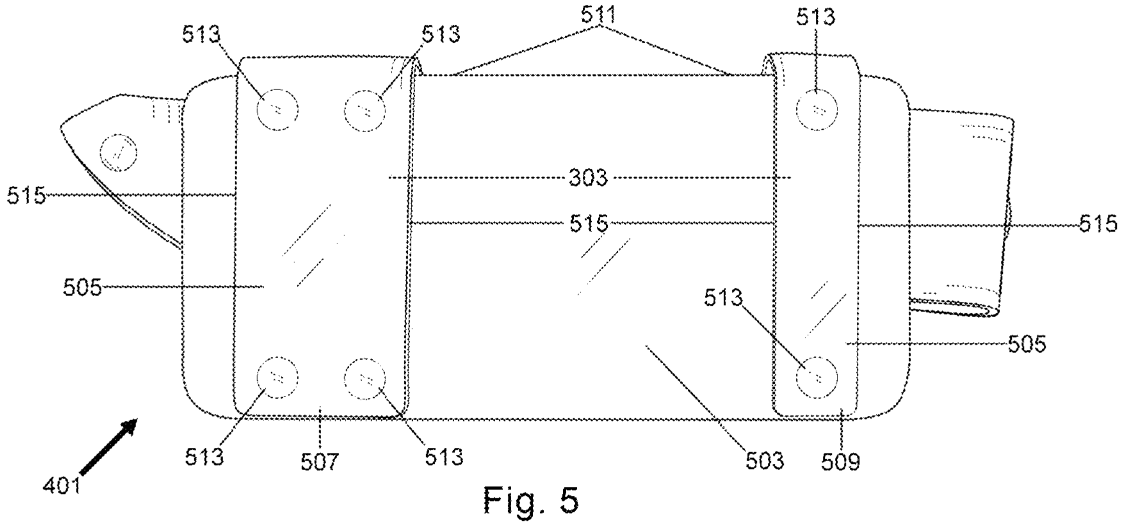
FIG. 5 is a side view of the same belt-mounting set as set forth above, in reference to FIG. 4, from the body-facing, back side (opposite to the front side depicted in FIG. 4) of the belt-mounting set, in accordance with some embodiments of the present application.

FIG. 5 is a side view of the same belt-mounting set 401 as set forth above, in reference to FIG. 4, from the back side 503 (i.e., user's body-facing when worn on a user's waist belt drawn about her or his waist) of the belt-mounting set, in accordance with some embodiments of the present application. Now visible from the new perspective of the figure, belt-mounting hardware 303 is shown as including multiple belt-engaging straps 505, attached to back side 503, in some embodiments. In some embodiments, belt-engaging straps 505 may be attached to back side 503 at multiple points. For example, in some embodiments, belt-engaging straps 505 are attached to back side 503 at or about strap ends, such as example strap end 507 and example strap end 509, and/or at or about an edge of knife sheath adapter 301, such as example back side edge 511. In some such embodiments, belt-engaging straps 505 are so attached with permanent fasteners or other attachment hardware, such as example rivets 513. Example rivets may include any suitable material known in the arts for attaching straps to textiles (e.g., leather goods) or other suitable materials for belt-mounting sheaths and sheath adapters (e.g., stainless steel, brass and/or plastics). In various alternative embodiments, however, belt-engaging straps 505 are attached to back side 503 by any other suitable method and fastening technique known in the art (e.g., stitching, clips, crimps, adhesives).

As discussed above, to use knife sheath adapter 301, and belt-mounting set 401 (of which it is a part), in some embodiments, such a user may thread her or his belt or strap (e.g., a waist belt) through belt-engaging straps 505, preferably in the configuration and orientation pictured relative to such a strap and belt aligned in a horizontal direction, as will be shown in figures set forth below. It should be understood, however, that in various embodiments, some or all of the components of belt-mounting set may be in alternative configurations and numbers of parts and subparts. For example, in some embodiments, any or all of the belt-mounting set(s), and part(s) and structures thereof set forth in the present application (e.g., of belt-mounting set 401) may be in a mirror image of that shown in the figures of this application. Such mirror image configurations will be referred to as a "left-handed version" of such belt-mounting set(s), and part(s) and structures thereof, in this application. Similarly, although two belt engaging straps 505 are pictured, one or three, or other numbers of straps, and other belt engaging straps, or other belt mounting hardware, may be included, in various alternative embodiments. [examples of alternative belt-mounting hardware.

Figure 6:
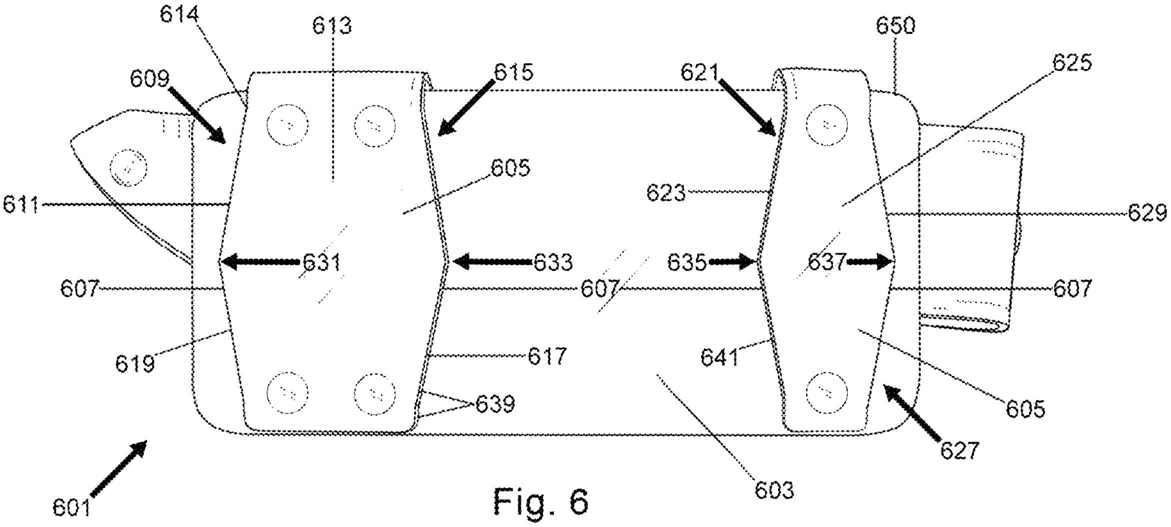
FIG. 6 is a side view of additional, alternative embodiments of a belt-mounting set, and, like FIG. 5, depicted from a body-facing, back side of the belt-mounting set, in accordance with some embodiments of the present application.

FIG. 6 is a side view of additional, alternative embodiments of a belt-mounting set 601, and, like FIG. 5, depicted from a body-facing, back side 603 of the belt-mounting set 601, in accordance with some embodiments of the present application. Like FIG. 5, belt-engaging straps (now shown as belt-engaging straps 605) are included in FIG. 6, but in different, alternative embodiments, of an alternative embodiment to a knife sheath adapter, now shown as alternative embodiment knife sheath adapter 650. Whereas belt-engaging straps 505 featured generally flat lengthwise sides 515, the alternative embodiment for belt-engaging straps 605 depicted in the present figure includes pointed sides 607, including a more complex profile, as pictured, including angles and points (discussed below). In addition, pointed sides 607 each include one or more such complex profiles, such as example complex profile 609 of example side 611, of wider strap 613. In some embodiments, wider strap 613 includes a complex profile on two of its sides, for example, also including complex profile 615 of example side 617 (opposite, and shown as a mirror image, to side 611) of wider strap 613. It should be noted that, although, in some embodiments pictured, such complex profiles include flat lines, such as the example flat line shown as flat line 619, and points, such as the examples discussed below, with curved transitions, such as the example curved transition 614, between them, in some other embodiments, such complex profiles include larger, continuous curves, in addition to, or as an alternative, to such flat lines and curved transitions.

As another example, example complex profile 621 of example side 623, of narrower strap 625, is also pictured. As with sides 611 and 617 of wider strap 613, in some embodiments, narrower strap 625 also includes a complex profile on multiple (e.g., two) of its sides. For example, in some embodiments, as pictured, narrower strap 625 also includes example complex profile 627 of example side 629 (opposite, and shown as a mirror image, to side 623), of narrower strap 625.

In some embodiments, any or all of the complex profiles such as those discussed above may include, and/or form and support, points, such as example point 631, example point 633, example point 635 and example point 637. Such points are depicted as centered, or, at least, approximately centered, vertically on sides of belt-accepting straps 605, and pointing outward from sides of those belt-accepting straps, and may be so vertically centered and pointing outward from belt-accepting straps in several additional embodiments. However, in some embodiments, multiple, differently spaced, and/or inward or otherwise facing points may be included. Similarly, in some embodiments, different forms of protrusions or involutions, other than points, may be included, in addition, or as an alternative, to the points set forth herein (e.g., rounded points or ends).

In some embodiments, such sides may include additional, different features, as an alternative, or in addition, the complex profiles of the sides of belt-engaging straps 605 shown. For example, in some embodiments, example side 611, example side 617, example side 623 and example side 629 may each be beveled (e.g., flat, rounded, groove, or double beveled) along their lengths (i.e., being curved also along the z-access (the access into and out of the age, in the perspective of the figure)). Examples of such bevels are shown as example bevel 639 and example bevel 641, which may, for example, be flat or grooved bevels, in some embodiments. In some embodiments, where textiles such as leather are used, such bevels may be created by skiving. In some embodiments, such bevels may be created by milling and/or machine.

Figure 7:
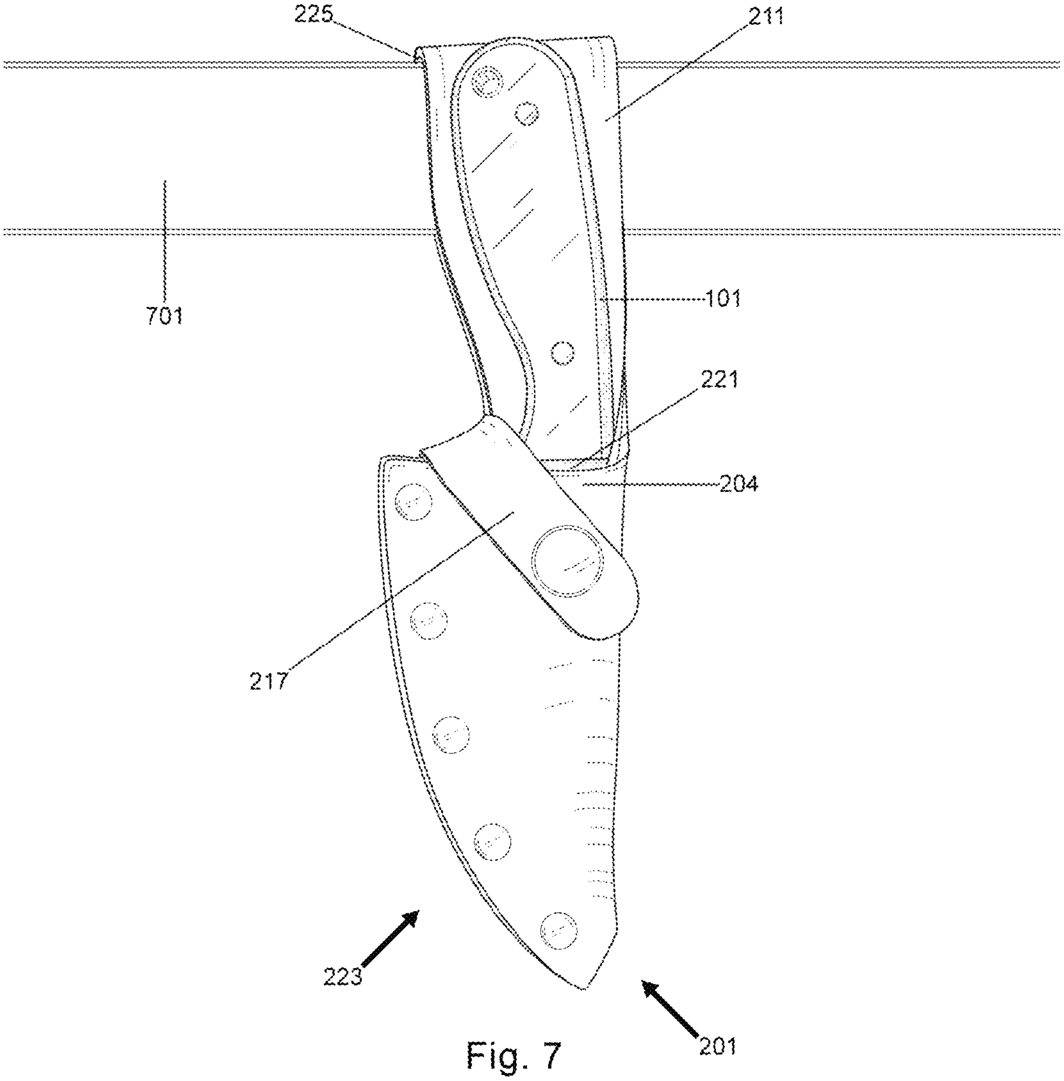
FIG. 7 is a side view of the same example knife as set forth above, in reference to FIGS. 1, 2 and 4, stowed in the same sheath configured to be mounted on a belt as set forth in FIGS. 2 and 4-6, directly mounted on an example belt, in accordance with some aspects of the present application.

FIG. 7 is a side view of the same example knife 101 as set forth above, in reference to FIGS. 1, 2 and 4, stowed in the same sheath 201 configured to be mounted on a belt as set forth in FIGS. 2 and 4-6, but now shown directly mounted on an example belt 701, in accordance with some aspects of the present application. As pictured, example belt 701 has now been threaded through example hole 225 of upper belt loop 211, mounting sheath 201 (and knife 101 within it) onto the example belt 701. As discussed above, in some embodiments, upper belt loop 211 is constructed from one or more (e.g., a plurality) of plies of fabric or other material (e.g., leather), and one or more metal fastener(s), such as a loop-forming rivet. In such embodiments, as pictured, such plies of leather form such a loop, surround and hold belt 701 and, in some embodiments, tightly affix sheath 201 in place on belt 701.

In some embodiments, a user may insert blade 103 into pocket 204 of sheath 201, and then wrap and fasten fastenable strap 217 around hilt or other edge 221 of blade 103, coupling knife 101 and sheath 201, forming a knife and sheath set 223 for safe traveling. In some such embodiments, a user may then (or earlier) thread belt 701, as pictured, which may then be wrapped around the user's waist, through hole 225 of upper belt loop 211, fasten the belt or strap, closing it, and travel with the knife and sheath set 223 without the need to hand-carry it. As also discussed above, generally speaking, sheath 201 is configured to be directly mounted on such a belt in a perpendicular orientation, relative to such a belt, as now pictured. Thus, when worn on a user's belt drawn about his or her waist, sheath 201 will generally run lengthwise in a direction parallel to his or her leg, as will also be demonstrated and discussed below.

Figure 8:
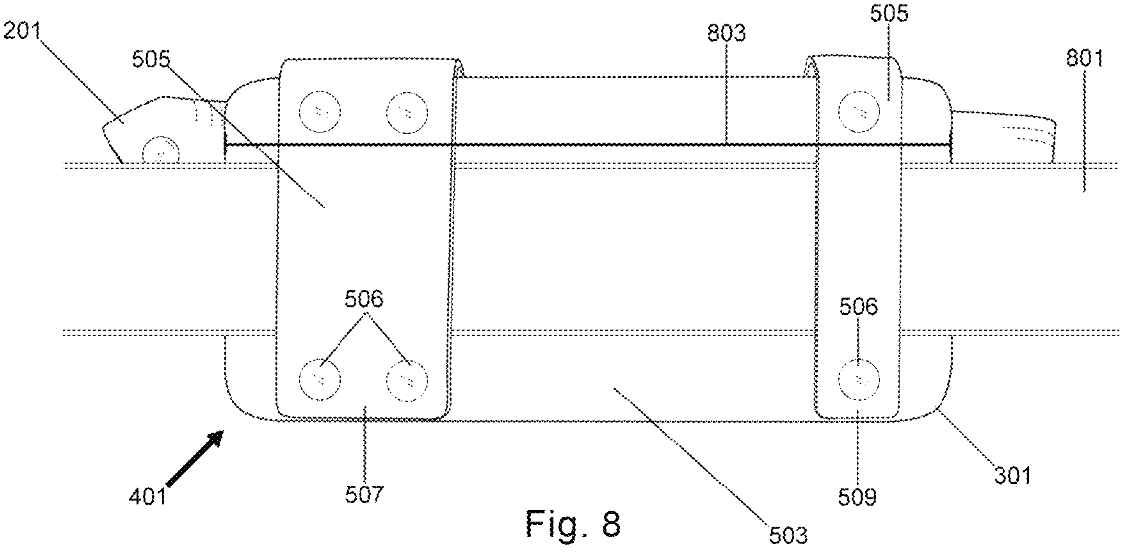
FIG. 8 is a side view of the same belt-mounting set as set forth above, in reference to FIGS. 4 and 5, from the body-facing side of the belt-mounting set, shown mounted on an example belt, in accordance with some embodiments of the present application.

FIG. 8 is a side view of the same belt-mounting set as set 401 forth above, in reference to FIGS. 4 and 5, from the back side 503 (i.e., the body-facing side), shown mounted on an example belt 801, in accordance with some embodiments of the present application. Example belt-engaging straps 505 are again depicted in the present figure, shown attached to back side 503, again, with rivets, such as example rivets 506, at or about example strap end 507 and example strap end 509.

As discussed above, to use belt-mounting set 401, in some embodiments, such a user may thread a belt or strap (e.g., a waist belt, such as example belt 801) through belt-engaging straps 505, preferably in the configuration and orientation pictured relative to such a strap and belt, aligned in a horizontal direction—namely, mounting the length 803 of set 401 in parallel with belt 801. Thus, after inserting a blade of knife 101 into sheath 201, and mounting sheath 201 within knife sheath adapter 301, a user has mounted the entire belt-mounting set 401 on her or his belt 801, which may then be fastened to her or his waist, and transport belt-mounting set 401.

Thus, at least in some embodiments, belt-mounting hardware and sheath-mounting hardware of a knife sheath adapter 301 are configured to engage a belt and a knife sheath, respectively, simultaneously, and hold such a belt and sheath, and a knife within the sheath, each in a parallel, or substantially parallel, orientation relative to one another (aligning their longest sides).

Figure 9:
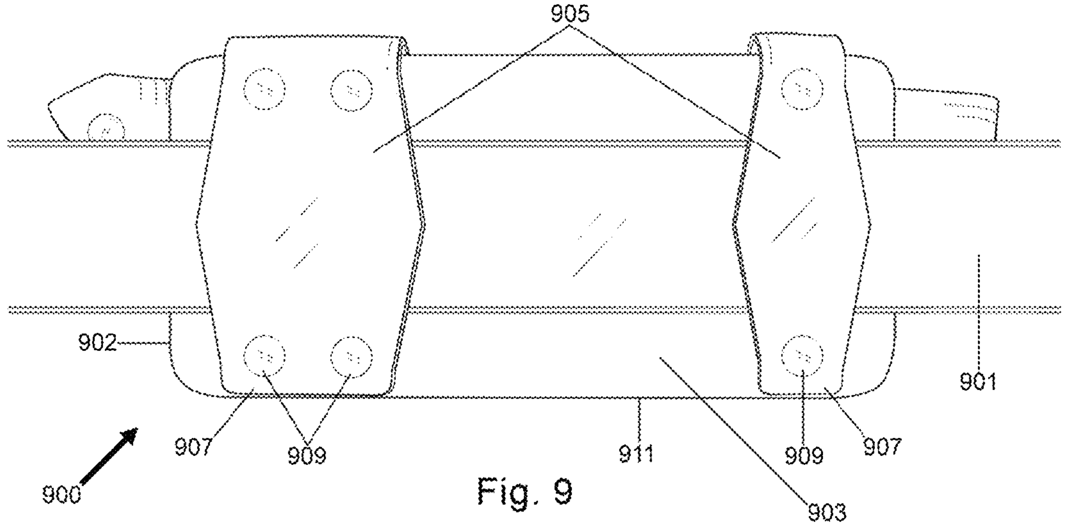
FIG. 9 is a side view of the same embodiment of a belt-mounting set, similar in nature to the example belt-mounting set as set forth above, in reference to FIG. 6, also from a body-facing side of the belt-mounting set, shown mounted on an example belt, in accordance with some embodiments of the present application.

FIG. 9 is a side view of an embodiment of a belt-mounting set 900, which may be similar in nature to example belt-mounting set 601, as set forth above, in reference to FIG. 6, but including an alternate embodiment of a knife sheath adapter—namely, example knife sheath adapter 902. As with FIG. 6, the belt-mounting set in the present figure (belt-mounting set 900) is also shown from a back side, namely, from a back side 903 (i.e., the body-facing side) of knife sheath adapter 902. Also as with example belt mounting set 601, at least in some embodiments, belt-mounting hardware and sheath-mounting hardware of knife sheath adapter 902 are configured to engage a belt and a knife sheath, respectively, simultaneously.

In the present figure, example knife sheath adapter 902 is shown mounted on an example belt 901, in accordance with some embodiments of the present application. Example belt-engaging straps 905, which may be similar to example belt-engaging straps 605, discussed above, are depicted in the present figure, and shown attached to back side 903, with example rivets, such as the rivets shown as example rivets 909, which may be located at or about example ends 907 of the belt-engaging straps 905, and at or about example lower back side edge 911, in some embodiments. In some embodiments, lower back side edge 911 is one side (i.e., the longest side) of a generally rectangular knife sheath adapter, as shown in the example knife sheath adapter 902, pictured.

As with belt-mounting set 601, to use belt-mounting set 900, in some embodiments, a user may thread a belt or strap (e.g., a waist belt, such as example belt 901) through belt-engaging straps 905, preferably in the configuration and orientation pictured relative to such a strap and belt. In such a configuration and orientation, belt-mounting set 900 and example knife sheath adapter 902 are aligned in a generally horizontal direction, meaning mounting set 900 and knife sheath adapter 902 are positioned and oriented lengthwise horizontally, as pictured, with lower back side edge 911 is oriented in parallel with the lengthwise direction of belt 901. In other words, when so positioned and aligned, example belt-mounting set 900, including example knife-sheath adapter 902, example knife sheath 201 and knife 101 held within it, and example belt 901 are all, at least generally, mounted in parallel to one another (each being held generally in a horizontal orientation lengthwise). Thus, after inserting a blade of knife 101 into sheath 201, and mounting sheath 201 onto and within knife sheath adapter 902, a user has mounted the entire belt-mounting set 900 on her or his belt 901, which may then be fastened to her or his waist, and may carry and transport belt-mounting set 900 on her or his person.

Figure 10:
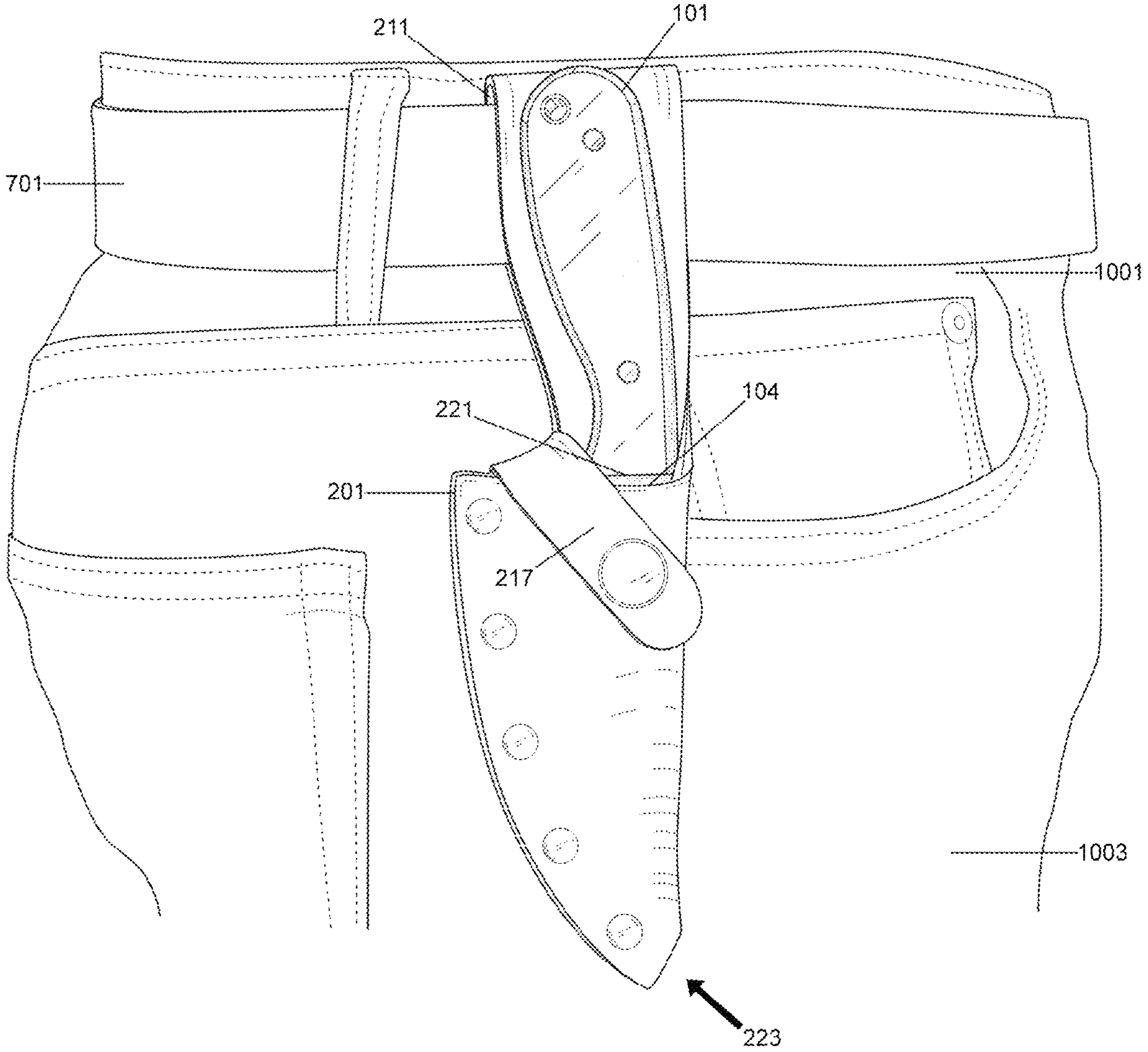
FIG. 10 is a side view of the same example knife stowed in the same sheath mounted on a belt as set forth in FIG. 7, shown worn on or about an example user's waist, in accordance with some aspects of the present application.

FIG. 10 is a side view of the same example knife 101 as set forth above, stowed in the same example sheath 201 mounted on an example belt 701 as set forth in FIG. 7, but now shown worn on or about an example user's waist 1001, in accordance with some aspects of the present application.

As pictured in FIG. 7, example belt 701 has been threaded through example upper belt loop 211, mounting sheath 201 (and knife 101 within it) onto the example belt 701. As also discussed above, in some embodiments, upper belt loop 211 is constructed from a plurality of plies of material, forming such an upper belt loop 211, which surrounds and holds belt 701 and, in some embodiments, tightly—affixing sheath 201 in place on belt 701.

Thus, as mentioned above, in some embodiments, a user may insert blade 103 into pocket 104 of sheath 201, and then wrap and fasten fastenable strap 217 around hilt or other edge 221 of blade 103, coupling knife 101 and sheath 201, forming a knife and sheath set 223 for safe traveling. In some such embodiments, a user may then (or earlier) thread belt 701, as pictured, which may then be wrapped around the user's waist, fasten the belt or strap, closing it, and travel with the knife and sheath set 223 without the need to hand-carry it.

As also discussed above, generally speaking, sheath 201 is configured to be directly mounted on such a belt in a perpendicular orientation, relative to such a belt, as now pictured. Thus, when worn on a user's belt drawn about his or her waist, sheath 201 will generally run lengthwise in a direction parallel to his or her leg 1003, as now shown.

Figure 11:
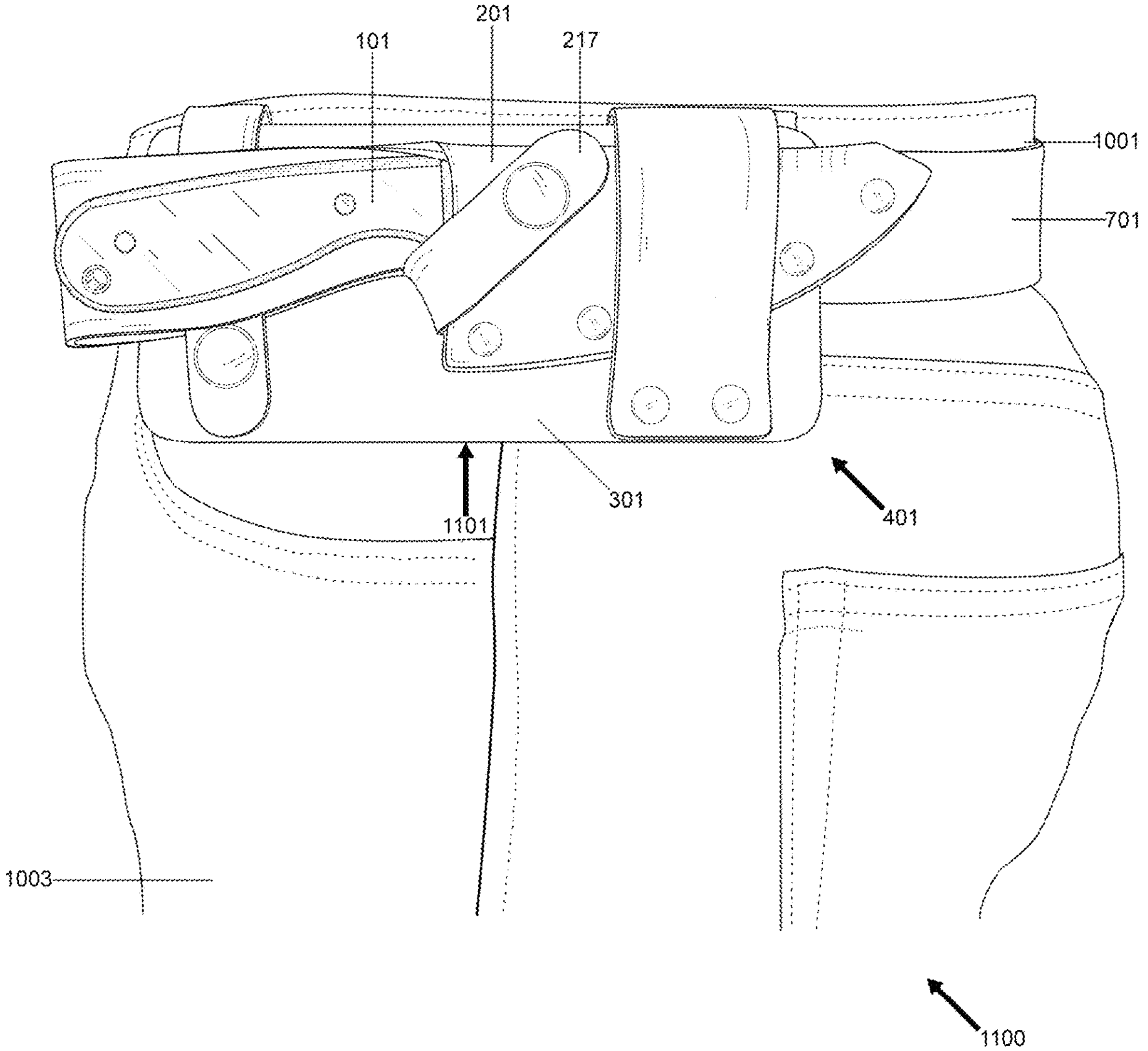
FIG. 11 is a side view of the same belt mounting set shown in FIG. 4, including the same example knife stowed in the same sheath mounted on the same example knife sheath adapter and belt as set forth in FIGS. 4, 8 and 10, shown worn on or about the same example user's waist in a new, alternative ("cross-draw") location and in a generally horizontal orientation, in accordance with some aspects of the present application.

FIG. 11 is a side view of the same belt-mounting set 401 as set forth above, including example knife 101, stowed in the same example sheath 201, mounted on example knife sheath adapter 301, mounted on a belt 701 as set forth in FIGS. 8 and 10, but now shown worn on or about the same example user's waist 1001 in a new, alternative location 1101 on or about her or his left-front hip area (i.e. a "cross-draw" location, meaning that the location 1101 is suitable for a user to sheathe and unsheathe example knife 101 in example sheath 201 by cross-drawing it, when using her or his dominant, e.g., right, hand), and in a generally horizontal orientation 1103, in accordance with some aspects of the present application. Example belt 701 has been threaded through belt-engaging straps (not pictured, on the back side of knife sheath adapter 301), mounting knife sheath adapter 301 (and sheath 201 mounted thereon and knife 101 within sheath 201) onto the example belt 701.

Generally speaking, knife sheath adapter 301, and set 401 as a whole, have been directly mounted onto belt 701 in a parallel orientation relative to the length of belt 701, as now pictured. Thus, when worn on a user's belt around his or her waist 1001, set 401, and each of its components will generally run in a direction parallel to his or her waist 1001, and perpendicular to (and avoiding contact with), his or her leg 1003, or, at least, a more distal portion of his leg 1003, as now shown.

In addition, due to this newly shown location of set 401, on example user 1100's left-hand hip, and if user 1100 is right-handed, he can now reach across to the left-hand side of his waist 1001 with is right hand side, and draw knife 101 with a natural grip. In other words, user 1100 may "cross-draw" knife 101 from sheath 201, in the location 1101 and orientation 1103, e.g., after releasing reversibly fastenable strap 217.

Figure 12:
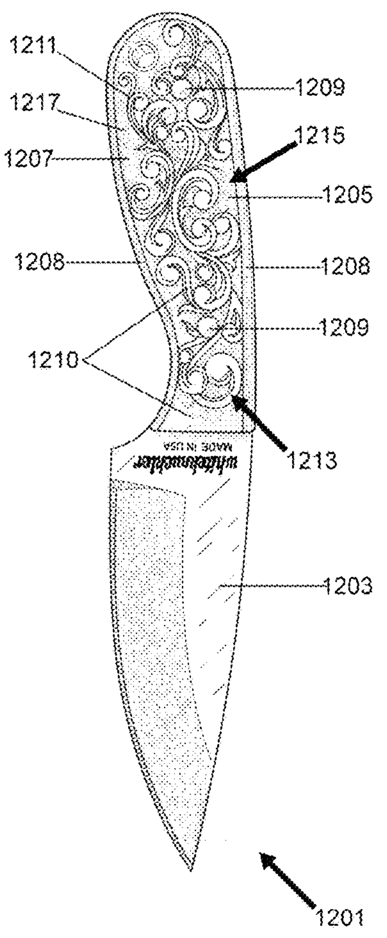
FIG. 12 is a side view of another, alternative embodiment of an example knife, in accordance with some aspects of the present application.

FIG. 12 is a side view of another, alternative embodiment of an example knife 1201, in accordance with some aspects of the present application. In some embodiments, example knife 1201 includes a number of components set forth for other knives in the present application, including, but not limited to, the following example features.

A blade 1203, which, in some such embodiments, may be integral with an example tang (not pictured in the present figure) extending into a handle 1205. In some embodiments, handle 1205 includes one or more scales, such as example right-side scale 1207, which may be integral with or fastened to the remainder of knife 1201 (e.g., with a fastener(s), such as example rivets 1209, and/or one or more a pin(s), screw(s), nail(s), bolt(s) or other mechanical fastener(s) and/or connector(s) which may be known in the art). In some embodiments, example right-side scale 1207 may include beveled corner edges 1208. However, in some embodiments, such corner edges may have a different exterior shape (e.g., rounded). In any event, scale 1207 may be flattened, at least in a main exterior side area 1210, in some embodiments. In some embodiments, such scales and/or such a handle may include a grip, lining, treatment, texture, rubberization, coating and/or other surface feature forming the exterior surface of the scales and/or handle 1205, such as example grip texture 1211.

In some embodiments, example grip texture 1211 also includes ornamental features, such as example engraved ornamental motif 1213. In some embodiments, example grip texture 1211 also includes ridges, grip dots, pocks and/or knurling 1215, enhancing a user's manual grip on the surface 1217 of handle 1205.

Figure 13:
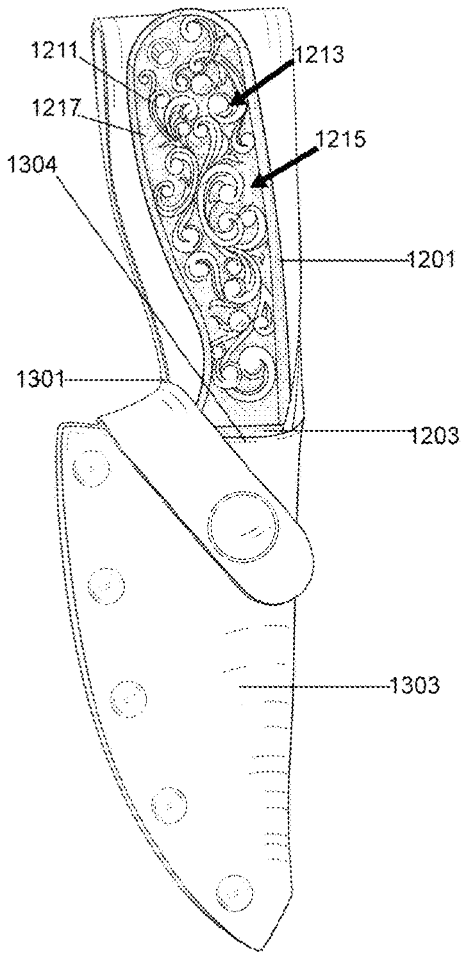
FIG. 13 is a side view of the same example knife as set forth above, in reference to FIG. 12, stowed in a sheath configured to be mounted on a belt, in accordance with some aspects of the present application.

FIG. 13 is a side view of the same example knife 1201, as set forth above, in reference to FIG. 12, stowed in an example sheath 1301 (which may be the same as, or similar to other embodiments of knife sheaths set forth in the present application, e.g., in FIGS. 2, 4, 7, 10 and 11) configured to be mounted on a belt, in accordance with some aspects of the present application. As pictured, knife 1201's blade 1203 has been inserted into a pocket section 1303 of sheath 1301, including a pocket 1304, protecting users from cutting injuries from blade 1303 when so stowed. In some embodiments, sheath 1301 may include any of the same suitable materials, structures and fasteners for knife sheaths as set forth elsewhere in this application—for example, as set forth with respect to sheath 201, discussed above.

Thus, as pictured, the example grip texture 1211, and its engraved ornamental motif 1213 is still visible, in some embodiments, to a viewer when knife 1201 is stowed in example sheath 1301. Furthermore, a user can readily grip the example grip textures of the handle 1205 of knife 1201, such as example grip 1211, including its ridges, grip dots, pocks and/or knurling 1215, enhancing a user's manual grip on the surface 1217 of handle 1205, in some embodiments.

Figure 14:
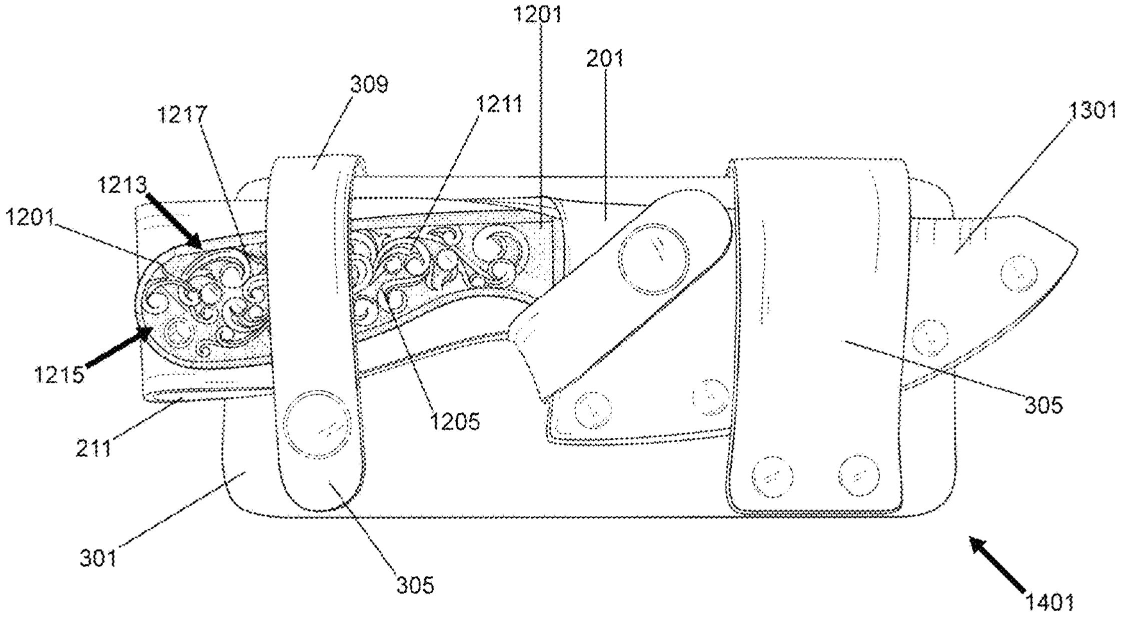
FIG. 14 is a side view of an example knife sheath adapter, coupled with the knife sheath, holding the alternative embodiment of an example knife, as set forth in FIG. 12, above, in accordance with some embodiments of the present application.

FIG. 14 is a side view of an example belt-mounting set 1401, configured to orient a knife sheath and knife in a parallel configuration relative to a belt, which belt-mounting set 1401 includes the same example knife sheath adapter 301 as set forth above, in reference to FIG. 3, coupled to example knife sheath 1301, which may be the same as, or at least similar in many respects, example knife sheath 201, set forth above, but holding alternative example knife 1201, set forth in reference to FIG. 12, rather than knife 101, set forth above, in reference to FIGS. 1 and 2, in accordance with some embodiments of the present application. In this figure, knife sheath adapter 301 is again shown in the same front side perspective as pictured above, in FIG. 3—namely, a front side perspective, again showing the same sheath-mounting hardware 305.

As shown in the present figure, even in its position and configuration, with example knife sheath 201 coupled to knife sheath adapter 301, and belt loop engaging strap 309 pulled over handle 1205, a user or other viewer can still view and access the majority of example grip texture 1211, and its engraved ornamental motif 1213, when knife 1201, sheath 1301 and knife sheath adapter 301 are mounted together, as pictured. Furthermore, a user can readily grip the example grip texture 1211, including its ridges, grip dots, pocks and/or knurling 1215, enhancing a user's manual grip on the surface 1217 of handle 1205, in some embodiments. If, as in some alternative embodiments, belt loop engaging strap 309 is threaded through upper belt loop 211, rather than pulled over handle 1205, substantially all of example grip texture 1211 is so visible and accessible to a user's grip.

Figure 15:
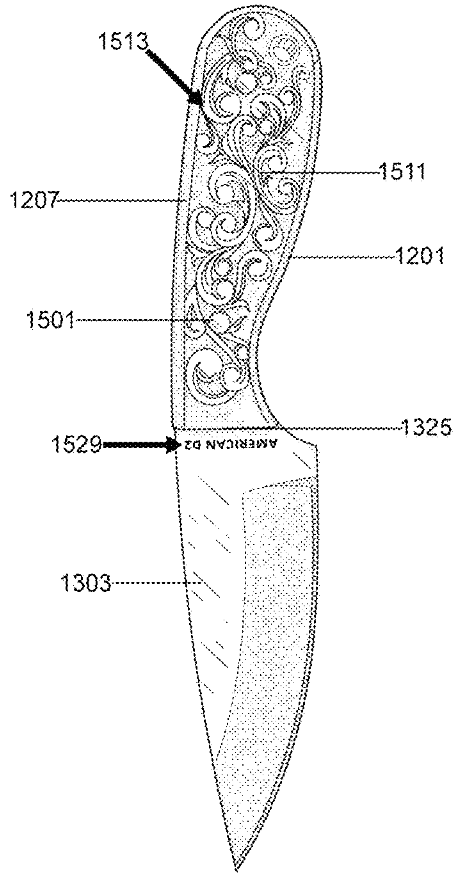
FIG. 15 is another, opposite side view of the same example knife forth above, in FIGS. 12-14, in accordance with some aspects of the present invention.

FIG. 15 is another side view of the same example knife 1201 forth above, from the opposite side of that shown in FIGS. 12-14, depicting, instead, the left-hand side 1501 of example knife 1201, in accordance with some aspects of the present invention. From the perspective of this figure, as with FIG. 12, most of the same features, aspects and sub-components of example knife 1201 can also be seen. However, most such features, aspects and sub-components are in a form that is a mirror-image of those set forth in FIG. 12. For example, an example grip texture 1511, and its engraved ornamental motif 1513, are in a pattern which is a mirror image of example grip texture 1211, and its engraved ornamental motif 1213, discussed above, on left-hand scale 1207.

In some embodiments, different informational indicator(s) (such as material component indicator 1529) may be provided, e.g., on or about base supporting region 1325. In some such embodiments, material component indicator may indicate a material used to construct blade 1303 (e.g., stating "American D2" as pictured, indicating that blade 1303 has been constructed using pure D2 steel, sourced exclusively from the United States of America) as used by WHITEKNUCKLER BRAND.

Figure 16:
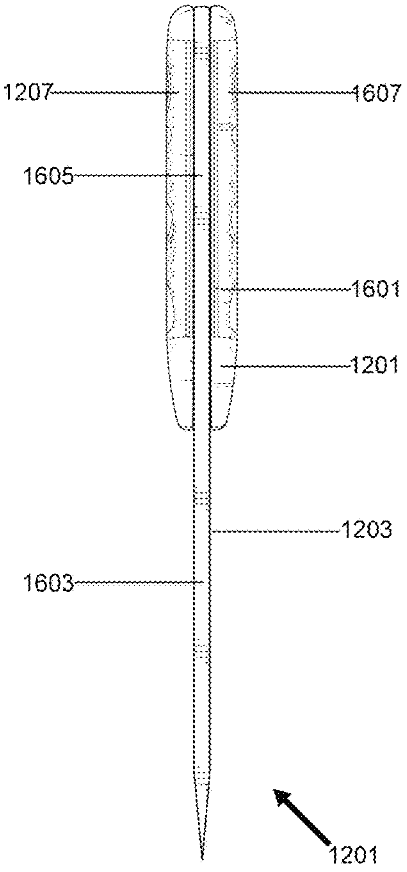
FIG. 16 is another side view, of the back of the same example knife forth above, in FIGS. 12-15, in accordance with some aspects of the present application.

FIG. 16 is another side view, of the back side 1601 of the same example knife 1201 forth above, in FIGS. 12-15, in accordance with some aspects of the present application. From the perspective pictured, some of the same features, aspects and sub-components of example knife 1201 can also be seen. In addition, the blunt, flattened back side 1603 of blade 1203 can be more clearly seen. Also, the integral construction, with a single metal piece forming both blade 1203 and tang 1605, between right-hand scale 1207 and example left-hand scale 1607, can now be seen.

Figure 17:
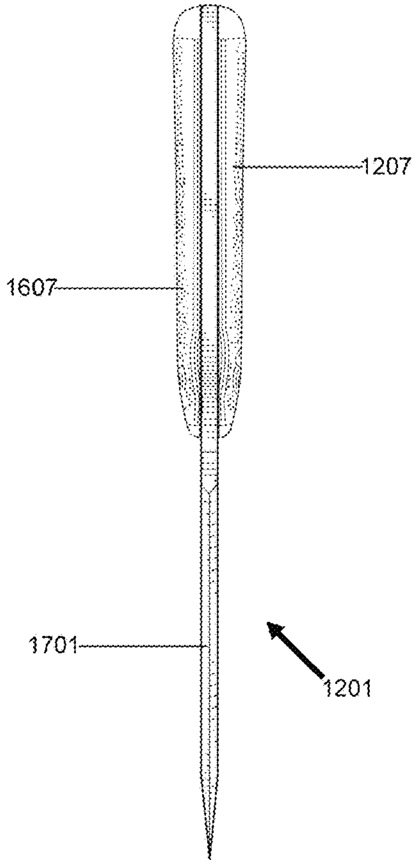
FIG. 17 is another side view, facing the edge of the same example knife forth above, in FIGS. 12-16, in accordance with some aspects of the present application.

FIG. 17 is another front side view of the same example knife 1201, from a perspective facing sharpened blade edge 1701 forth above, in FIGS. 12-16, in accordance with some aspects of the present application. In other words, the view depicted in the present figure is from the opposite side than the view depicted in FIG. 16, above. Thus, for example, from the perspective shown in the present figure, right-hand scale 1207 and example left-hand scale 1607 are on opposite sides than that depicted in FIG. 16, above.

Figure 18:
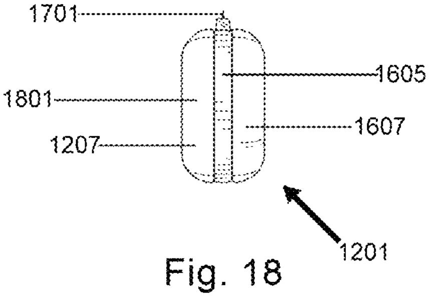
FIG. 18 is a bottom view of the same example knife forth above, in FIGS. 12-17, in accordance with some aspects of the present application.

FIG. 18 is a bottom view of the same example knife 1201 forth above, in FIGS. 12-17, in accordance with some aspects of the present application. In the perspective of the figure, the generally rounded shape of the butt 1801 of knife 1201 can be seen. And several features of knife 1201, including the tang 1605, handle scales (including left-hand scale 1207 and right-hand scale 1607) and edge 1701 can still be clearly seen.

Figure 19:
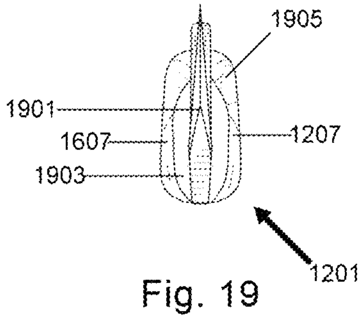
FIG. 19 is a top view of the same example knife forth above, in FIGS. 12-18, in accordance with some aspects of the present application.

FIG. 19 is a top view of the same example knife 1201 forth above, in FIGS. 12-18, facing sharpened tip 1901, in accordance with some aspects of the present application.

From the perspective of this figure, a flat side 1903 of hilt 1905 of knife 1201 can be more clearly seen, among other features.

Figure 20:
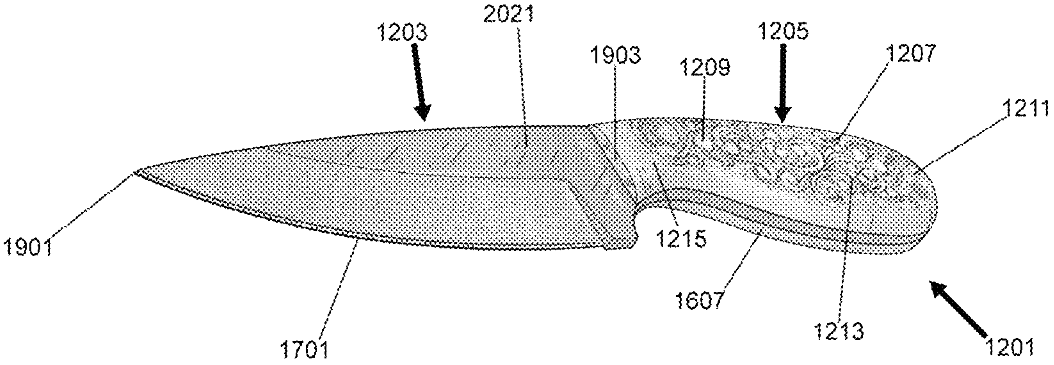
FIG. 20 is a perspective view of the same example knife forth above, in FIGS. 12-19, in accordance with some aspects of the present application.

FIG. 20 is another perspective view (namely a three-quarter view, at an angle between the left-hand side depicted above, in FIG. 15 and edge-on side, depicted above, in FIG. 17) of the same example knife 1201 set forth above, in FIGS. 12-19, in accordance with some aspects of the present application. From the perspective depicted, a more complete view, and sense of the shape of example knife 1201, can be appreciated simultaneously. For example, each of left-hand scale 1207 and right-hand scale 1607 forming part of the handle 1205, as well as several other sub-features thereof, including flat side 1903, rivets 1209, example grip texture 1211 (and its engraved ornamental motif 1213) and ridges, grip dots, pocks and/or knurling 1215, for example. As another example, the left-hand side of blade 1203 can also be clearly seen, along with several sub-features thereof, such as flat, unsharpened, supporting region 2021, sharpened blade edge 1701 and sharpened tip 1901.

Figure 21:
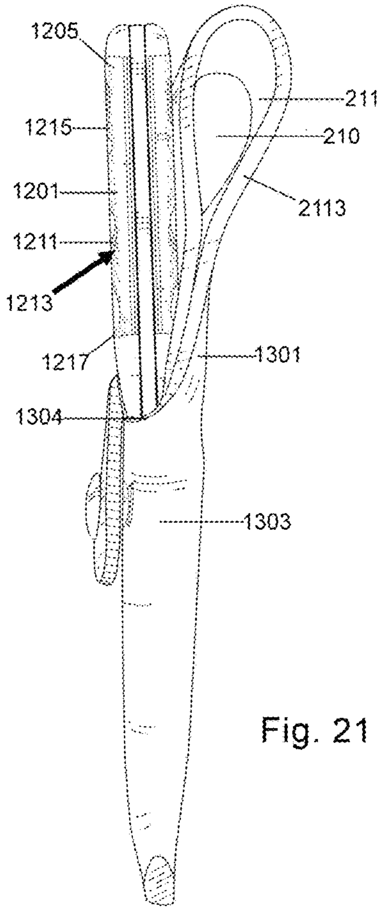
FIG. 21 is a side view, from the same perspective as FIG. 16, of the same example knife forth above, in FIGS. 12-20, shown stowed in the same example sheath as set forth above, in FIGS. 2, 4-11, 13, and 14, in accordance with some aspects of the present application.

FIG. 21 is a side view, from the same perspective as FIG. 16, facing the blunt, flattened back side 1603 of blade 1203 of the same example knife 1201 set forth above, in FIGS. 12-20, now stowed in the same example sheath 1301 as set forth above, which may be the same as, or at least similar in nature to any of the sheaths shown in FIGS. 2, 4-11, 13, and 14, in accordance with some aspects of the present application. From the perspective of the present figure, upper belt loop 211, is now shown more clearly. As explained above, such a belt loop may be constructed from one or more plies of leather, such as example loop ply 2113, and one or more metal fastener(s), such as example loop-forming rivet 2315 set forth below, forming a central hole 210, through which a user's belt or strap may be threaded, in some embodiments.

As pictured, knife 1201's blade 1203 has been inserted into a pocket section 1303 of sheath 1301, including a pocket 1304, protecting users from cutting injuries from blade 1203 when so stowed. In some embodiments, sheath 1301 may include any of the same suitable materials, structures and fasteners for knife sheaths as set forth elsewhere in this application—for example, as set forth with respect to sheath 201, discussed above.

Even in the narrow perspective of the figure, the example grip texture 1211 and its engraved ornamental motif 1213 are still visible, in some embodiments, to a viewer when knife 1201 is stowed in example sheath 1301. Furthermore, a user can readily grip the example grip textures of the handle 1205 of knife 1201, such as example grip texture 1211, including its ridges, grip dots, pocks and/or knurling 1215, enhancing a user's manual grip on the surface 1217 of handle 1205, in some embodiments.

Figure 22:
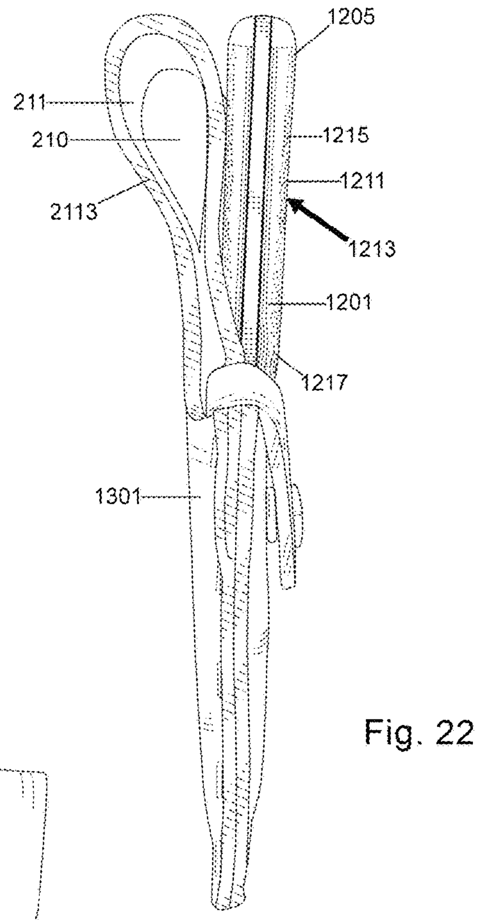
FIG. 22 is an edge-on side view, from the same perspective as FIG. 17, of the same example knife set forth above, in FIGS. 12-21, shown stowed in the example same sheath as set forth above, in FIGS. 2, 4-11, 13, and 14, in accordance with some aspects of the present application.

FIG. 22 is an edge-on side view, from the same perspective as FIG. 17, of the same example knife 1201 set forth above, in FIGS. 12-21, shown stowed in the same example sheath 1301 as set forth above, which may be the same as, or at least similar in nature to any of the sheaths shown above, in FIGS. 2, 4-11, 13, and 14, in accordance with some aspects of the present application. The view depicted in the present figure is facing the sharpened edge of blade 1203 (not visible in the present figure), and the opposite side as that depicted in FIG. 21, above (which was from the blunt, back side view).

Once again, from the perspective of the figure, upper belt loop 211, and its central hole 210, formed from one or more plies of leather, such as example loop ply 2113, is clearly shown. As in FIG. 21, knife 1201's blade 1203 has been inserted into sheath 1301, protecting users from cutting injuries from blade 1203 when so stowed. From this perspective, example grip texture 1211 and its engraved ornamental motif 1213 are still visible, in some embodiments, to a viewer when knife 1201 is stowed in example sheath 1301. And as discussed above, even when example knife 1201 is stowed within example sheath 1301, a user can readily grip the example grip textures of the handle 1205 of knife 1201, such as example grip texture 1211, including its ridges, grip dots, pocks and/or knurling 1215, enhancing a user's manual grip on the surface 1217 of handle 1205, in some embodiments, as now shown.

Figure 23:
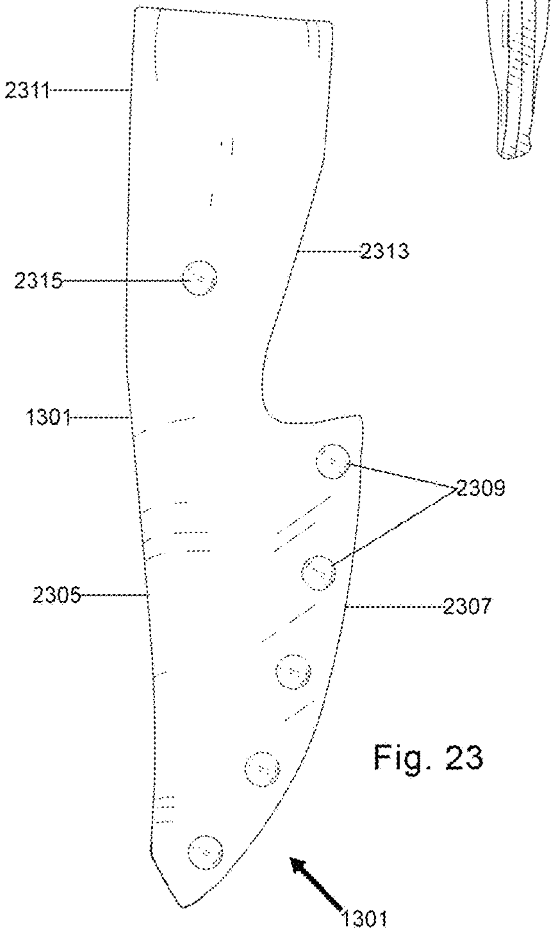
FIG. 23 is a side view of the same sheath as set forth above, in FIGS. 2, 4-11, 13, and 14 and 22, shown from the opposite side (body-facing) than shown in FIG. 2, in accordance with some aspects of the present application.

FIG. 23 is a back side view of the same example sheath 1301 as set forth above, which may be the same as, or at least similar in nature to any of the sheaths shown above in FIGS. 2, 4-11, 13, and 14 and 22, now shown from the opposite side (body-facing) than shown in FIG. 2, in accordance with some aspects of the present application. As with other sheaths set forth in the present application, in some embodiments, sheath 1301 may include any suitable material for knife sheaths such as, but not limited to, the examples set forth above for such knife sheaths, or combinations, blends, mixtures and/or alloys of such materials. In some embodiments, sheath 1301 may be constructed from leather, and one or more metal fastener(s). However, in some embodiments, sheath 1301 may be constructed, at least in part, using adhesives and/or stitching, instead of, or in addition to, such fastener(s). In some embodiments, sheath 1301 may be constructed from one or more plies of leather, folded at a folded side 2305, and fastened together (and/or onto itself), at a tail side 2307, by metal (e.g., stainless steel) fasteners, such as example rivets 2309.

In some embodiments, belt-mounting hardware is included sheath 1301, such as example upper belt loop 2311. In some embodiments, upper belt loop 2311 is also constructed from one or more plies of leather, such as example loop ply 2313, and one or more metal fastener(s), such as example loop-forming rivet (not pictured in the present figure, but pictured below as loop-forming rivet 2308).

In some such embodiments, a user may then (or earlier) thread a belt or strap (e.g., a belt placed about the user's waist) through upper belt loop 2311, fasten the belt or strap, closing it, and travel with the knife and sheath set. Generally speaking, sheath 1301 is configured to be directly mounted on such a belt in a perpendicular orientation, relative to such a belt. Thus, when worn on a user's belt drawn about his or her waist, sheath 1301 will generally run lengthwise in a direction parallel to his or her leg, as demonstrated above, assuming that knife sheath adapter(s) as discussed in the present application, are not used.

Figure 24:
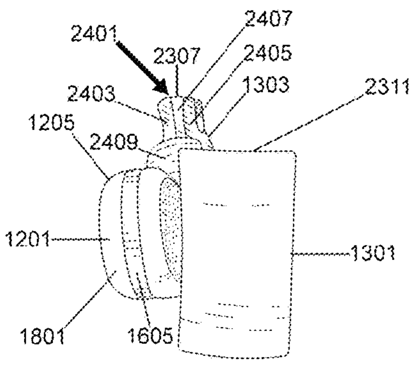
FIG. 24 is a top view of the same example knife as shown in FIGS. 12-21, stowed in the same sheath as set forth above, in FIGS. 2, 4-11, 13, 14, 22 and 23, in accordance with some aspects of the present application.

FIG. 24 is a top view (from the handle side) of the same example knife 1201 as shown in FIGS. 12-22, stowed in the same sheath 1301 as set forth above, which may be the same as, or at least similar in nature, to any of the sheaths shown above in FIGS. 2, 4-11, 13, 14, 22 and 23, in accordance with some aspects of the present application. Now visible in the present figure, multiple plies of material 2401 can now be seen, folded and held together on or about a tail side 2307 of pocket section 1303. In the example pictured, three (3) tails or plies of material can be seen: namely, (1) a knife-side ply 2403, forming the knife-hand side of pocket section 1303; (2) another, opposite side ply 2405, on the side of sheath 1301 opposite to knife 1201, forming the other side of pocket section 1303 and forming loop 2311; and (3) a central tail or ply 2407, aiding to form belt loop 2311. Other aspects visible from the perspective of the figure include, but are not limited to, example handle 1205, butt 1801, tang 1605, reversibly fastenable strap 2409 (which may be the same as, or similar in nature to, reversibly fastenable strap 217, discussed above, in some embodiments).

Figure 25:
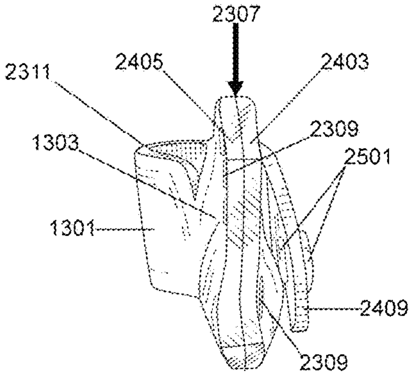
FIG. 25 is a bottom view of the same sheath as set forth above, in FIGS. 24, in accordance with some aspects of the present application.

FIG. 25 is a bottom view of the same sheath 1301 as set forth above, in FIG. 24, in accordance with some aspects of the present application. Although knife 1201 is not presently visible, being blocked from view by sheath 1301 in the present perspective, it may be held in place by example reversibly fastenable strap 2409 (e.g., via a reversible metal snap 2501).

From the perspective of the present figure, multiple plies of material can again be seen, folded and held together on or about tail side 2307 of pocket section 1303. At least two (2) tails or plies of material can again be seen in the present figure: namely, (1) knife-side ply 2403, forming the knife-hand side of pocket section 1303; and (2) opposite side ply 2405, on the side of sheath 1301 as loop 2311, forming the other side of pocket section 1303 and aiding in forming loop 2311. Those two plies of material are shown as fastened together, for example, by metal rivets, such as example metal rivets 2309.

Figure 26:
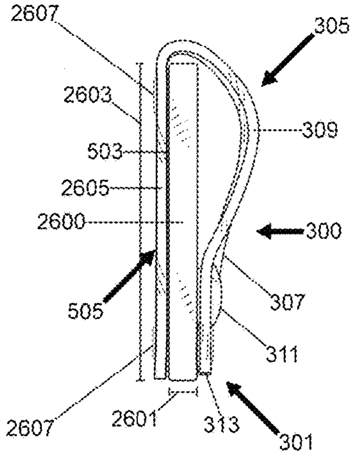
FIG. 26 is a left, side view of the example knife sheath adapter set forth above, in FIGS. 3, 4, 5, 8, 11 and 14, in accordance with some aspects of the present application.

FIG. 26 is a left side view of the example knife sheath adapter 301 set forth above, in FIGS. 3, 4, 5, 8, 11 and 14, in accordance with some aspects of the present application. From the perspective of the figure, a thickness, shown by example thickness measuring line 2601, of a main body 2600 of knife sheath adapter 301 can be seen, relative to various size aspects of knife sheath adapter 301. In some embodiments, for example, either a greater or lesser thickness than that shown and measured by 2601, relative to a height, shown by example height measuring line 2603, of main body 2600 may be provided. The relative thickness and height of main body 2600, and knife sheath adapter 301 overall, as pictured are examples, and many different possible sizes and relative proportions for components of knife sheath adapters are also within the scope of the present application, as will be apparent to those of skill in the art. In some embodiments, main body 2600 may comprise a textile or flexible material. In some embodiments, main body 2600 may include a structural support (e.g., an internal, rigid support). In any event, main body 2600 may be attached (e.g., via an adhesive, stitching, and/or fasteners) to belt mounting hardware, in some embodiments, such as the example belt-engaging straps 505, discussed above, one of which—namely, example belt-engaging strap 2605, is now visible (from an edge-on, side perspective). As with other belt-engaging straps 505, belt-engaging strap 2605 may be attached to back side 503, of knife sheath adapter 301, in some embodiments. As also discussed above, rivets, such as example rivets 2607, may be included, so attaching belt-engaging strap 2605 to back side 503. In various alternative embodiments, however, belt-engaging straps 505 are attached to back side 503 by any other suitable method and fastening technique known in the art (e.g., stitching, clips, crimps, adhesives).

Also pictured, on front side 300 of knife sheath adapter 301, in some embodiments, such a knife sheath adapter includes also includes sheath-mounting hardware 305. For example, in some embodiments, sheath-mounting hardware 305 may include one or more straps, such as example sheath pocket section holding strap 307, and example belt loop engaging strap 309. In some embodiments, such sheath-mounting hardware can be fastened and unfastened to such a sheath by reversible fastening hardware. For example, in some embodiments, at least belt loop engaging strap 309 includes a reversible fastener, such as example snap 311 (at least part of which may be present on example belt loop engaging strap 309). However, in some embodiments, any reversible fastener known in the art, and suitable for attaching and detaching the ends of straps, and/or opening and closing loops and straps, may be used, alternatively or in addition to example snap 311, to attach and detach an end 313 of example belt loop engaging strap 309 from main body 2600 of example knife sheath adapter 301.

Figure 27:
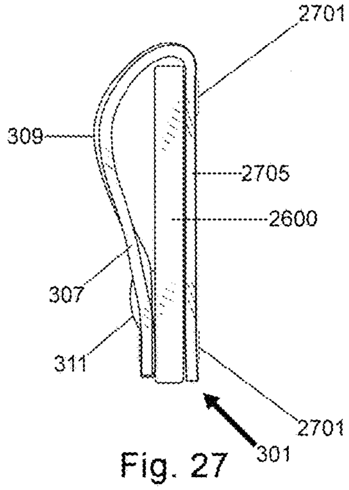
FIG. 27 is a bottom view of the example knife sheath adapter set forth above, in FIGS. 3, 4, 5, 8, 11, 14 and 26, in accordance with some aspects of the present application.

FIG. 27 is a right side view of the example knife sheath adapter 301 set forth above, in FIGS. 3, 4, 5, 8, 11, 14 and 26, in accordance with some aspects of the present application. From the perspective of the figure, the same components of knife sheath adapter 301 as shown in FIG. 26, above, can also be seen, albeit differently, from the opposite side. For example, from the perspective of the present figure, example sheath pocket section holding strap 307 is now more visible to the viewer, partially blocking view of example belt loop engaging strap 309, and different example rivets 2701 are now visible, on the right side of main body 2600, fastening example sheath pocket section holding strap 307 thereto. Similarly, a different belt-engaging strap, namely, belt-engaging strap 2705, is now visible, effectively blocking view of belt-engaging strap 2605 (which, instead, had been visible in FIG. 26.)

Figure 28:
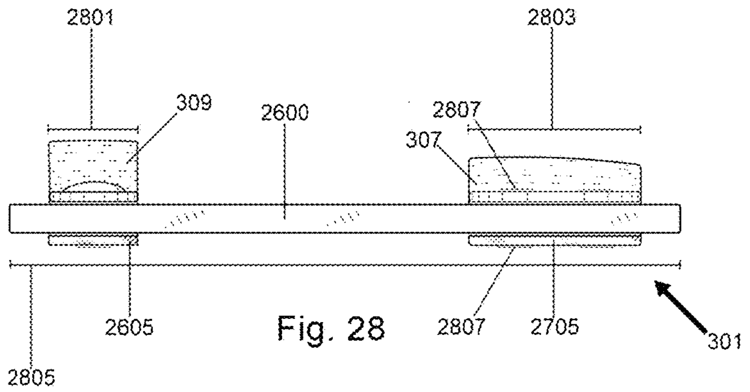
FIG. 28 is a bottom view bottom view of the example knife sheath adapter set forth above, in FIGS. 3, 4, 5, 8, 11, 14, 26 and 27, in accordance with some aspects of the present application.

FIG. 28 is a bottom view of example knife sheath adapter 301 set forth above, in FIGS. 3, 4, 5, 8, 11, 14, 26 and 27, in accordance with some aspects of the present application. From the perspective of the figure, many of the same components of knife sheath adapter 301 as shown in FIGS. 24-27, above, can also be seen, albeit differently, from the bottom side. For example, from the perspective of the present figure, both example sheath pocket section holding strap 307 and example belt loop engaging strap 309 are clearly visible, along with their relative widths, as shown by example width measuring line 2801 and example width measuring line 2803, demonstrating the widths of example sheath pocket section holding strap 307 and example belt loop engaging strap 309, respectively. Similarly, the overall length of example knife sheath adapter 301 can also now be seen, as demonstrated by example length-measuring line 2805, adjacent to example knife sheath adapter 301. As discussed above, however, in some alternative embodiments, for example, either greater or lesser widths, lengths and any other proportions for any component(s) of example knife sheath adapter 301, other than that shown and measured, may be provided. The relative length of main body 2600, and knife sheath adapter 301 overall, as pictured, are examples, and many different possible sizes and relative proportions for components of knife sheath adapters are also within the scope of the present application, as will be apparent to those of skill in the art.

It may also be noted that an additional example rivet 2807, fastening belt-engaging strap 2705 to main body 2600, is now visible, in the perspective of the present figure. Of course, as discussed above, the exact number and placement of rivets shown are only examples of the many different possible numbers and arrangements of rivets, and/or other fasteners, that may be so provided.

Figure 29:
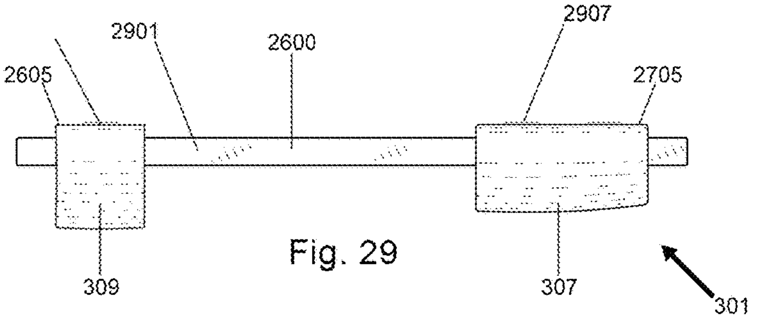
FIG. 29 is a top view bottom view of the example knife sheath adapter set forth above, in FIGS. 3, 4, 5, 8, 11, 14, 26, 27 and 28, in accordance with some aspects of the present application.

FIG. 29 is a top view bottom view of the example knife sheath adapter 301 set forth above, in FIGS. 3, 4, 5, 8, 11, 14, 26, 27 and 28, in accordance with some aspects of the present application. From the perspective of the figure, many of the same components of knife sheath adapter 301 as shown in FIGS. 24-28, above, can also be seen, albeit differently, from the top side. In particular, from the present, top side perspective, example belt loop engaging strap 307 and example belt loop engaging strap 309 partially block view of, and wrap around, a top edge 2901 of main body 2600.

It may also be noted that an additional example rivets 2907, fastening belt-engaging strap 2605 and belt-engaging strap 2705 to main body 2600, is now visible, in the perspective of the present figure. Of course, as discussed above, the exact number and placement of rivets shown are only examples of the many different possible numbers and arrangements of rivets, and/or other fasteners, that may be so provided.

Figure 30:
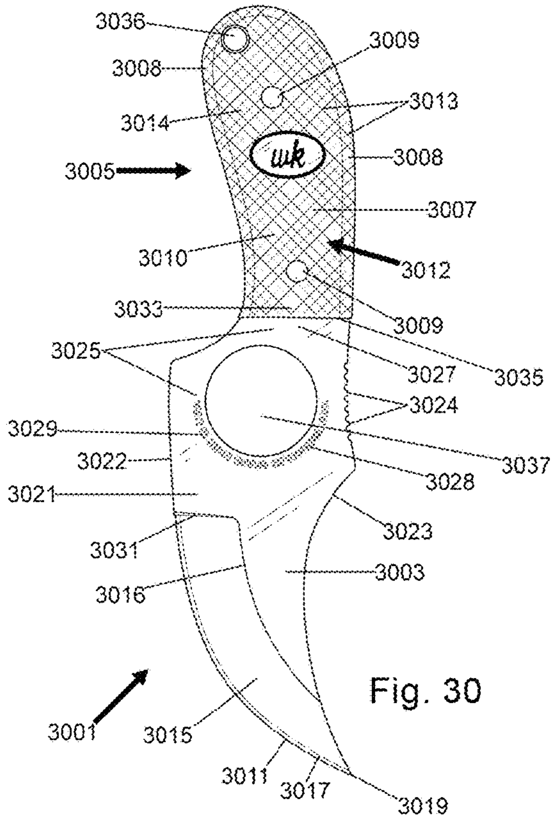
FIG. 30 is a side view of an example knife, in accordance with some aspects of the present application.

FIG. 30 is a side view of an example knife 3001, in accordance with some aspects of the present application. In some embodiments, example knife 3001 includes a blade 3003, which, in some such embodiments, may be integral with an example tang (not visible in the present FIG. extending into a handle, such as example handle 3005. In some embodiments, handle 3005 includes one or more scales, such as example right-side scale 3007, which may be integral with or fastened to the remainder of knife 3001 (e.g., with a fastener(s), such as example pins or rivets 3009, and/or one or more a screw(s), nail(s), bolt(s) or other mechanical fastener(s) and/or connector(s)). In some embodiments, scale 3007 may have beveled corner edges 3008. However, in some embodiments, such corner edges may have a different exterior shape (e.g., rounded). In any event, scale 3007 may be flattened, at least in a main exterior side area 3010, in some embodiments. In some embodiments, such scale(s) and/or such a handle may include a grip, lining, treatment, texture, rubberization, coating and/or other surface feature forming the exterior surface of the scale(s) and/or handle 3005 (such as example grooved grip texture 3012), shown. In other embodiments, a different form of gripped texture, the same as, or similar in nature, to texture 1211, and/or aspects thereof, set forth above, may be provided. In some embodiments, example grip texture 3012 includes ornamental features, such as example engraved ornamental motif 3013 (in the form of cross-hatching). In some embodiments, example grip texture 3012 also includes ridges, grip dots, pocks and/or knurling, enhancing a user's manual grip on the surface 3014 of handle 3005.

In various embodiments, knife 3001 may be constructed from any known, suitable material for making knives known in the art. For example, in some embodiments, blade 3003 may be constructed from a metal and/or metal alloy. In some such embodiments, blade 3003 may be constructed from stainless steel. In some such embodiments, blade 3003 may be constructed from D2 steel, sourced from the United States.

In some embodiments, knife 3001 includes a sharpened blade edge 3011, which, in some embodiments, may be a wedge-shaped blade edge, formed from a wedge-shaped blade. In some such embodiments, a slope of such a wedge-shaped blade may originate along a line 3016 on an outer surface 3015 of blade 3003, and continuing toward sharpened blade edge 3011 (from right to left, in the perspective of the figure). In some embodiments, the slope of the wedge-shaped blade may be complex, including a more oblique wedge angle and flatter slope, e.g., beginning at an outer surface line 3017, again continuing toward sharpened blade edge 3011. In some embodiments, the wedge-shaped blade edge 3011 forms a part of a sharpened tip 3019 of blade 3003 (and knife 3001). In an unsharpened, supporting region 3021, however, a blunt edge 3022 of blade 3003 is generally flat, in some embodiments, meaning that the outer surface of supporting region 3021, all the way to the blunt edge 3022, on the left-hand side of blade 3001, is perpendicular to the viewer of FIG. 30. Similarly, a back side 3023 of blade 3001, on a side opposite from blunt edge 3022 and blade edge 3011, is also preferably generally flat and blunt, but may include gripping elements, such as example thumb-grip ridges 3024, in some embodiments, allowing a user to place her or his thumb against the back side 3023 of blade 3001 and gain a solid grip, without cutting her or his hand. In some embodiments, another, base supporting region 3025, at or about a base 3027 of blade 3003, is also generally flat, like supporting region 3021, and base supporting region 3025's outer surface is also perpendicular to the viewer in FIG. 30, of blade 3003, in some embodiments. In some embodiments, branding 3028 or other informational indicators (such as country of origin indicator 3029) may be provided, e.g., on or about base supporting region 3025. However, in some embodiments, branding or such indicators may be provided elsewhere, on, in or throughout knife 3001, as an alternative, or in addition to, the locations pictured. In some embodiments, a sloped transition area 3031 may be provided, between base supporting region 3025 and the wedge-shaped blade.

In some embodiments, a hilt 3033 may be provided, at or about the base supporting region 3025, where it abuts handle 3005, in some embodiments. In some embodiments, hilt 3033 may be formed by a part (e.g., a flat edge 3035) of scale 3007. However, in some embodiments, a separate or other part may form such a hilt or other guard, protecting a user's hand during cutting and thrusting movements using knife 3001.

In some embodiments, a lanyard mounting hole 3036 may be provided, through which a lanyard (not pictured) may be threaded and/or mounted, in some embodiments.

In some embodiments, a finger- and/or thumb-accessible grip-enhancing hole, such as example finger- and/or thumb-accessible grip-enhancing hole 3037, may be included. In some embodiments, as pictured, finger- and/or thumb-accessible grip-enhancing hole 3037 is provided as a hole through blade 3003.

Figure 31:
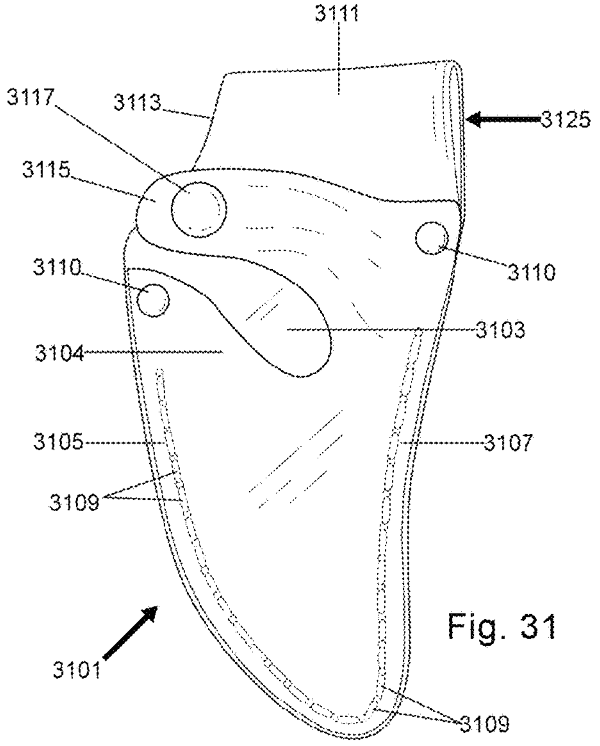
FIG. 31 is a front side view of an example sheath, configured to hold a knife such as that set forth above, in reference to FIG. 30, and configured to be mounted on a strap or belt, in accordance with some aspects of the present application.

FIG. 31 is a front side view of an example sheath 3101, configured to accept knife 3001, and/or a similar knife, and configured to be mounted on a strap or belt, in accordance with some aspects of the present application. In some embodiments, discussed in greater detail below, the blade of such a knife may be been inserted into a pocket section 3103 of sheath 3101, including a pocket 3104, protecting users from cutting injuries from blade 3003 when so stowed. In some embodiments, sheath 3101 may include any suitable material for knife sheaths such as, but not limited to, leather, plastics, metals, fabrics, carbon fiber and/or KEVLAR. In some embodiments, pocket section 3103 and sheath 3101 may be constructed from leather, and one or more metal fastener(s). However, in some embodiments, pocket section 3103 and sheath 3101 may be constructed, at least in part, using adhesives and/or stitching, instead of, or in addition to, such fastener(s). For example, as pictured, sheath 3101 may be constructed from one or more plies of leather, fastened together (and/or onto itself), at left side 3105 and right side 3107, by example stitching 3109 (e.g., with polyester, bonded nylon or waxed linen cord and/or threads) and/or metal (e.g., stainless steel) rivet(s), such as example rivets 3110.

In some embodiments, belt-mounting hardware is included in sheath 3101, such as example upper belt loop 3111. In some embodiments, upper belt loop 3111 is also constructed from one or more plies of leather, such as example loop ply 3113, held in a loop configuration by stitching, such as example stitching 3109, and/or example rivets and one or more metal fastener(s), such as example rivets 3110 (and, as shown below, additional loop-holding rivets 3309).

In some embodiments, sheath 3101 may include a knife-retaining stay or band, such as example reversibly fastenable strap 3115. In some embodiments, fastenable strap 3115 includes at least part of a reversible fastener, such as example snap 3117 (part of which fastener is also present on pocket section 3103 (not visible in the present figure). In some embodiments, reversibly fastenable strap 3115, when fastened, wraps around and holds part of a hilt or other edge 3035 of blade 3003, retaining it within pocket 3104. In such embodiments, reversibly fastenable strap 3115, when so fastened, serves as a safety, preventing the inadvertent release and exposure of blade 3003, which might otherwise cause accidental injuries to the user or others.

In some embodiments, a user may insert blade 3003 into pocket 3104 of sheath 3101, and then wrap and fasten fastenable strap 3117 around hilt or other edge 3035 of blade 3003, coupling knife 3001 and sheath 3101, forming a knife and sheath set, such as example knife and sheath set 3201, set forth below, for safe traveling. In some such embodiments, a user may then (or earlier) thread a belt or strap (e.g., a belt placed about the user's waist) through a hole 3125 of upper belt loop 3111, fasten the belt or strap, closing it, and travel with such a knife and sheath set. Generally speaking, sheath 3101 is configured to be directly mounted on such a belt in a perpendicular orientation, and lengthwise, vertically, relative to such a belt, horizontally fastened to a user's waist, when so using hole 3125 as belt-mounting hardware (not fully pictured). Thus, when so worn on a user's belt drawn about his or her waist, sheath 3101 will generally run lengthwise in a direction parallel to his or her leg.

Figure 32:
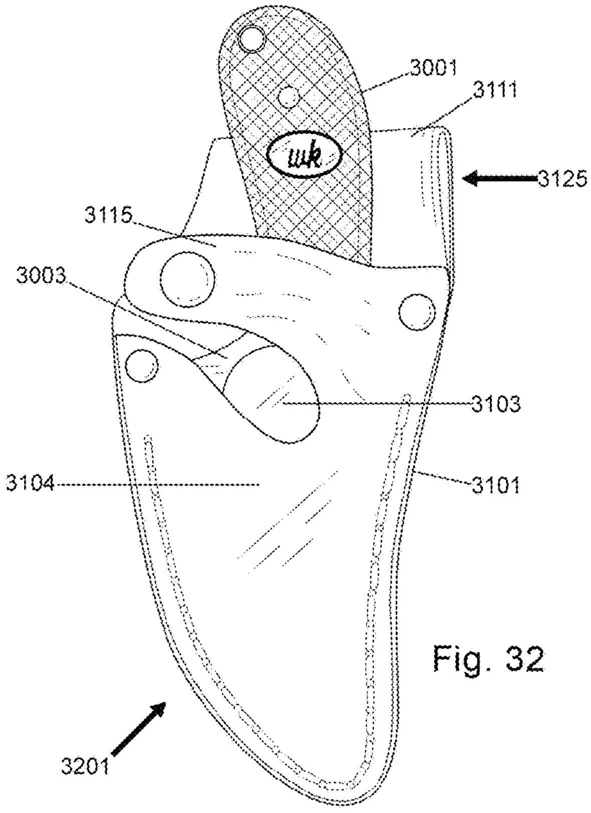
FIG. 32 is a front side view of the same example knife, as set forth above, in reference to FIG. 1, stowed in the example sheath, set forth above, in reference to FIG. 31, forming a new form of knife and sheath set, in accordance with some aspects of the present application.

FIG. 32 is a front side view of the same example knife 3001, as set forth above, in reference to FIG. 1, stowed in sheath 3101, forming a knife and sheath set 3201, in accordance with some aspects of the present application. As pictured, the blade 3003 has been inserted into pocket section 3103 of sheath 3101, and, thereby, into pocket 3104, protecting users from cutting injuries from blade 3003 when so stowed, and facilitating transport of knife and sheath set 3201, in some embodiments.

As mentioned above, and as now pictured, in some embodiments, a user may insert blade 3003 into pocket 3104 of sheath 3101, and then wrap and fasten fastenable strap 3115 around hilt or other edge 3035 of blade 3003, coupling knife 3001 and sheath 3101, forming knife and sheath set 3201, for safe traveling. In some such embodiments, a user may then (or earlier) thread a belt or strap (e.g., a belt placed about the user's waist) through a hole 3125 of upper belt loop 3111, fasten the belt or strap, closing it, and travel with the knife and sheath set 3201. Generally speaking, sheath 3101 is configured to be directly mounted on such a belt in a perpendicular orientation, relative to such a belt. Thus, when worn on a user's belt drawn about his or her waist, sheath 3101 will generally run lengthwise in a direction parallel to his or her leg (each being vertically oriented lengthwise).

Figure 33:
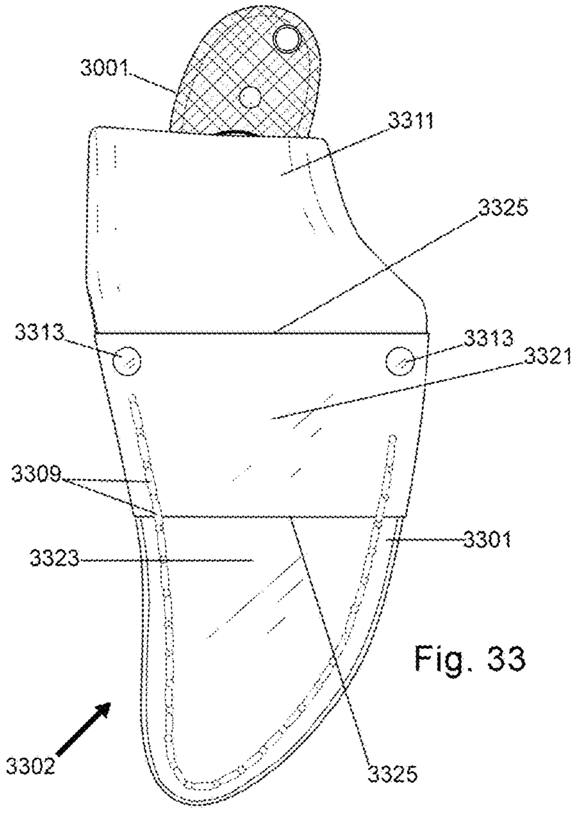
FIG. 33 is a back side view of the example sheath set forth above, in FIGS. 31 and 32, in accordance with some aspects of the application.

FIG. 33 is a back side view of example knife 3001, as set forth above, in reference to FIG. 30, stowed in an example knife sheath 3301 (which may be the same as, or similar to, example sheath 3101, discussed above, in some embodiments) forming a knife and sheath set 3302, which may be the same as or similar to example knife and sheath set 3201, discussed above, in some embodiments.

As discussed above, with reference to a knife and sheath set 3201, in some embodiments, a user may thread a belt or strap through an upper belt loop, such as example belt loop 3311 of example sheath 3301, to carry example sheath 3301 and a knife held within it (e.g., example knife 3001) in a vertically-oriented position, as pictured. However, as now visible in the perspective of this figure, in some embodiments a user may, alternatively or in addition, in various embodiments, thread a belt or strap through other, alternative belt-mounting hardware included in, on or about example knife sheath 3301. For example, in some embodiments, such belt-mounting hardware includes one or more belt-engaging strap(s), such as example belt-engaging strap 3321. In some embodiments, belt engaging strap 3321 is fastened tightly against a main body 3323 of example knife sheath 3301 (e.g., via example stitching 3309 and/or example loop-holding rivets 3313, in some embodiments). Even though fastened tightly, belt-engaging strap 3321 is preferably made from an at least somewhat flexible material, such as leather, and, at least over time, belt-engaging strap 3321 will loosen as a user passes a belt or other strap between strap 3321 and main body 3323 of example knife sheath 3301, allowing for easy mounting and un-mounting of example knife sheath 3301 on such a belt or other strap. As can be seen in the present figure, belt-engaging strap 3321 includes liftable (e.g., by a user's fingers and/or by prying) horizontal strap edges 3325, allowing such a passage of a belt or other strap vertically, in the perspective of the figure. Thus, when so mounted on a belt fastened around the waist of a user, such as the example waist belt pictured above, in FIG. 10, using the alternative belt-mounting hardware (i.e., belt-engaging strap 3321) example knife sheath 3301, and such a waist belt, will hold knife 3001 (when properly stowed, in a parallel, or substantially parallel, orientation relative to the waist belt.

Figure 34:
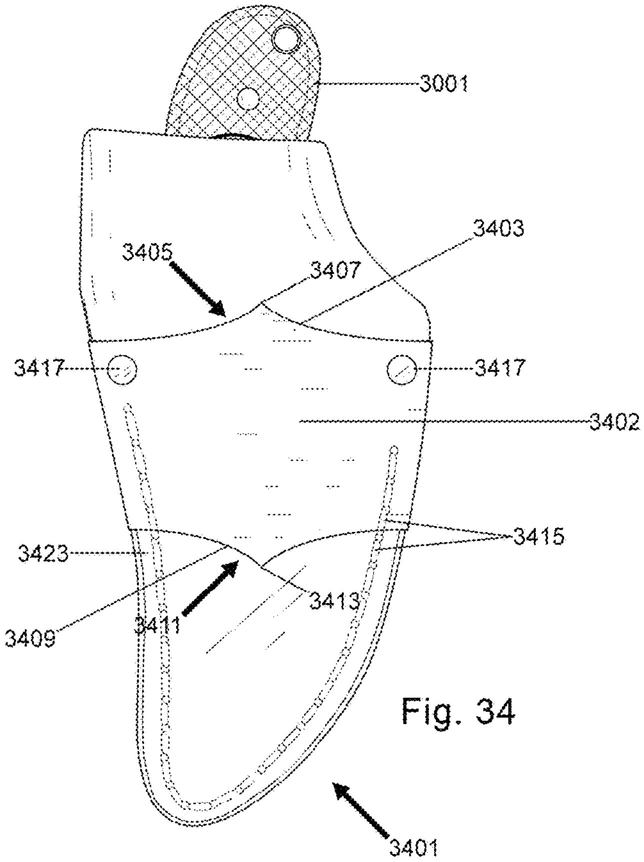
FIG. 34 is a back side view of an alternate embodiment of the example sheath set forth above, in FIGS. 31-33, in accordance with some aspects of the application.

FIG. 34 is a back side view of an alternate embodiment of an example knife sheath 3401, which may be the same as or similar to example knife sheath 3101, discussed above, in accordance with some aspects of this application. In the embodiment pictured, again, alternative belt-mounting hardware is included in, on or about example sheath 3401. A new form of belt-engaging strap 3402 is now shown, which includes at least two liftable outer edges (e.g., liftable by a user's fingers and/or prying): 1) an upper liftable edge 3403 with a complex curved profile 3405, culminating in at least one point 3407; and 2) a lower liftable edge 3409 with a complex curved profile 3411, culminating in at least one point 3413. As with example knife sheath 3101 and strap 3321, discussed above, in some embodiments, belt engaging strap 3402 is fastened tightly against a main body 3423 of example knife sheath 3401 (e.g., via example stitching 3415 and/or example loop-holding rivets 3417, in some embodiments).

In some embodiments, a user may lift point 3407 and/or point 3413, and then thread a belt or strap between belt-engaging strap 3402 and main body 3423, to mount and carry example knife sheath 3401 and knife 3001, held within it, in this alternative embodiment of an example knife sheath 3401.

Figure 35:
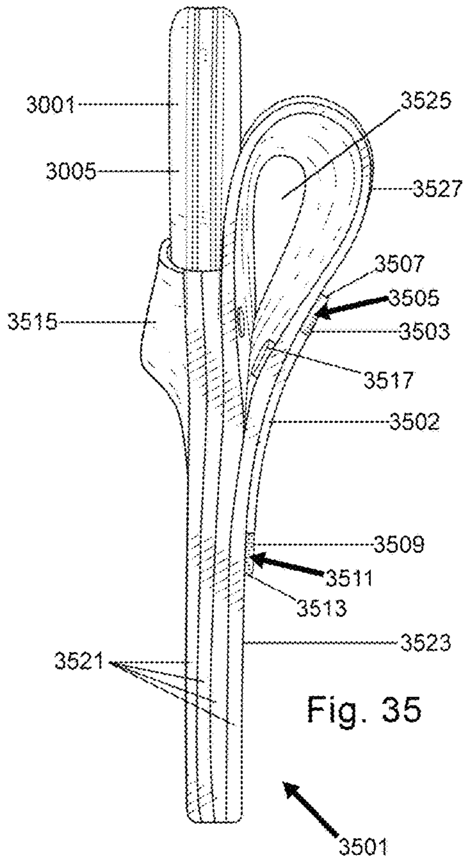
FIG. 35 is a side view of the same example embodiment of a knife sheath set forth above, in reference to FIG. 34, and with an example knife stowed and held within it in, and showing the example knife sheath and example knife from a perspective facing the blunt, flattened back side of a blade of the example knife, in accordance with some aspects of this application.

FIG. 35 is a back side view of an example embodiment of a knife sheath 3501, which may be the same as or similar to example knife sheaths, set forth above, in reference to FIG. 31 et seq., and showing example knife 3001 stowed and held within it in. Both the example knife sheath and example knife are shown from a perspective facing the blunt, flattened back side of a blade of the example knife, in accordance with some aspects of this application. In the embodiment pictured, again, alternative belt-mounting hardware (which may be the same as or similar to belt-mounting hardware set forth immediately above in reference to FIG. 34), is included in, on or about example sheath 3501. An alternate form of belt-engaging strap 3502 is now shown, which includes at least two liftable outer edges (e.g., liftable by a user's fingers and/or prying): 1) an upper liftable edge 3503 with a complex curved profile 3505, culminating in at least one point 3507; and 2) a lower liftable edge 3509 with a complex curved profile 3511, culminating in at least one point 3513. As with example knife sheath 3101 and strap 3321, and as with example knife sheath 3401 and strap 3402, discussed above, in some embodiments, belt engaging strap 3502 is fastened tightly against a main body 3523 of example knife sheath 3501 (e.g., via stitching (not visible in the present figure) and/or rivets, such as example rivet 3517, in some embodiments).

In some embodiments, a user may lift point 3507 and/or point 3513, and then thread a belt or strap between belt-engaging strap 3502 and main body 3523, to mount and carry example knife sheath 3501 and knife 3001, held within it, in this alternative embodiment of an example knife sheath 3501.

As also visible in FIG. 35, in some embodiments, sheath 3501 may include a knife-retaining stay or band, such as example reversibly fastenable strap 3515, shown holding handle 3005 of knife 3001. Also, as with other knife sheaths set forth in the present application, in some embodiments, example knife sheath 3501 is an at least partially laminate structure, meaning that it is constructed from layers of leather, cloth, or another materials, such as example material layers 3521. In some embodiments, example material layers 3521 are held together by stitching, adhesives, rivets, and/or other fastening techniques.

In addition to using belt-engaging strap 3502 to mount example knife sheath 3501 on a user's strap or belt (for example, in a horizontal orientation, parallel the user's belt), in some embodiments, a user may choose to thread such a belt or strap through central hole 3525, of example upper belt loop 3527, carrying example knife sheath 3501 and knife 3001 in a different orientation, perpendicular to such a belt.

Figure 36:
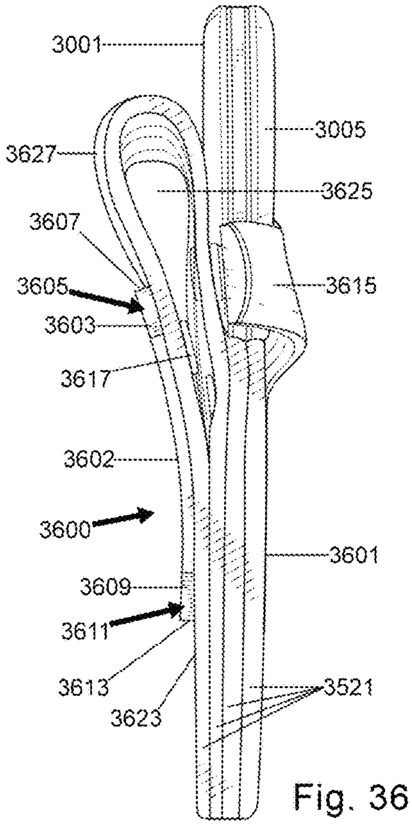
FIG. 36 is an edge-on side view, of the same example embodiment of a knife sheath shown above, in reference to FIG. 31 et seq, and an example knife shown stowed and held within it, in accordance with some aspects of the present application.

FIG. 36 is an edge-on side view, of the same example knife 3001, set forth above, shown stowed and held in an example knife sheath 3601, which may be the same as or similar to the example knife sheath shown above, in reference to FIG. 31 et seq., in accordance with some aspects of the present application. The view depicted is from a perspective facing the sharpened edge of blade 3003 (not visible in the present figure), and the opposite side of example knife sheath 3601 and knife 3001 stowed within it, as that depicted in FIG. 35, above (which was from a back side view, facing the blunt, narrow back side of knife 3001 and blade 3003).

In the embodiment pictured, again, alternative belt-mounting hardware 3600 (which may be the same as or similar to belt-mounting hardware set forth above in reference to FIGS. 34-35), is again shown on or about example sheath 3601, in a different perspective. In some embodiments, such alternative belt-mounting hardware includes an example alternate form of belt-engaging strap 3602 (which may be the same as belt-engaging strap 3502, above) is shown, which again includes at least two liftable outer edges (e.g., liftable by a user's fingers and/or prying): 1) an upper liftable edge 3603 with a complex curved profile 3605, culminating in at least one point 3607; and 2) a lower liftable edge 3609 with a complex curved profile 3611, culminating in at least one point 3613. In some embodiments, upper liftable edge 3603, complex curved profile 3605, point 3607, lower liftable edge 3609, complex curved profile 3611 and point 3613 are the same as upper liftable edge 3503, complex curved profile 3505, point 3507, lower liftable edge 3509, complex curved profile 3511 and point 3513, as discussed above, respectively. As with example knife sheath 3501 and strap 3502, discussed above, in some embodiments, belt engaging strap 3602 is fastened tightly against a main body 3623 (which, in some embodiments, is the same as main body 3523) of example knife sheath 3601 (e.g., via stitching (not visible in the present figure) and/or rivets, such as example rivet 3617, in some embodiments).

In some embodiments, a user may lift point 3607 and/or point 3613 (e.g., with her or his finger, or an implement, such as a knife blade), and then thread a belt or strap between belt-engaging strap 3602 and main body 3623, to mount and carry example knife sheath 3601 and knife 3001, held within it, in this alternative embodiment of an example knife sheath 3601.

As also visible in FIG. 36, in some embodiments, example knife sheath 3601 may include a knife-retaining stay or band, such as example reversibly fastenable strap 3615 (which, in some embodiments, is the same as reversibly fastenable strap 3515, discussed above), shown holding handle 3005 of knife 3001. Also, as with other knife sheaths set forth in the present application, in some embodiments, example knife sheath 3601 is an at least partially laminate structure, meaning that it is constructed from layers of leather, cloth, or another materials, such as example material layers 3621. In some embodiments, example material layers 3621 are held together by stitching, adhesives, rivets, and/or other fastening techniques. In some embodiments, example material layers 3621 are the same as example material layers 3521, discussed above.

In addition to using belt-engaging strap 3602 to mount example knife sheath 3601 on a user's strap or belt (for example, in a horizontal orientation, parallel the user's belt), in some embodiments, a user may choose to thread such a belt or strap through central hole 3625, of example upper belt loop 3627, carrying example knife sheath 3601 and knife 3001 in a different orientation, perpendicular to such a belt.

Figure 37:
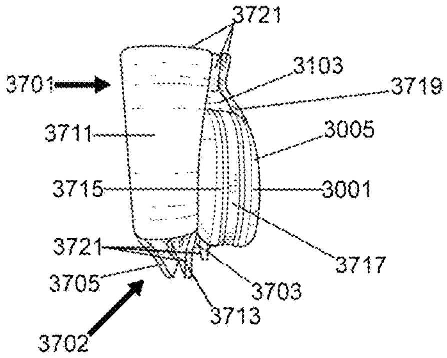
FIG. 37 is a top view of the same example knife as shown in FIG. 30 et seq., shown stowed and held in an example knife sheath, which may be the same example knife sheath shown above, in reference to FIG. 31 et seq., as set forth above, in accordance with some aspects of the present application.

FIG. 37 is a top view (from the handle side) of the same example knife 3001 as shown in FIG. 30 et seq., shown stowed and held in an example knife sheath 3701, which may be the same as or at least similar to the example knife sheath shown above, in reference to FIG. 31 et seq., as set forth above, in accordance with some aspects of the present application.

Now visible in the present figure, multiple plies of material 3721 can now be seen, some of which are held together on or about a tail side 3702 of example knife sheath 3701, in some embodiments. In the example pictured, at least three (3) plies of material can be seen: namely, (1) a knife-side ply 3703, which aids in forming pocket section 3103 (not fully visible in the present figure); (2) another, opposite side ply 3705, on the side of example knife sheath 3701 opposite to knife 3001, helping to form loop 3711; and (3) another knife-hand side ply 3713, also aiding to form loop 3711 and helping form part of pocket section 3103. Other aspects visible from the perspective of the figure include, but are not limited to, example handle 3005, butt 3715, tang 3717, reversibly fastenable strap 3719 (which may be the same as, or similar in nature to, reversibly fastenable strap 3515, discussed above, in some embodiments).

Figure 38:
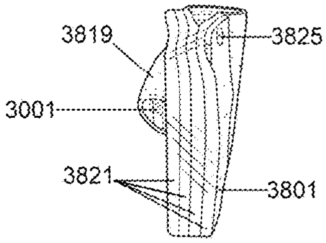
FIG. 38 is a bottom view (from tip side) of the same example knife as shown in FIG. 30 et seq., shown stowed and held in an example knife sheath 3801, which may be the same as the example knife sheath shown above, in reference to FIG. 31 et seq., in accordance with some aspects of the present application.

FIG. 38 is a bottom view (from tip side) of the same example knife 3001 as shown in FIG. 30 et seq., shown stowed and held in an example knife sheath 3801, which, in some embodiments, is the same as the example knife sheath shown above, in reference to FIG. 31 et seq., in accordance with some aspects of the present application. The perspective of the current figure is from the opposite side of knife 3001 and knife sheath 3701, discussed above. Example knife 3001 is not entirely visible in the present figure, being largely blocked from view by example knife sheath 3801 in the present perspective, and partially covered and held in place by example reversibly fastenable strap 3819 (which, in some embodiments, is the same as reversibly fastenable strap 3715, discussed above, in some embodiments.) Similarly, as with other reversibly fastenable straps set forth in the present application, reversibly fastenable strap 3819 may be reversibly opened and closed, releasing and holding knife 3001, respectively, with reversible fastener hardware (e.g., via a reversible metal snap, which, in some embodiments, is the same as snap 3117, discussed above) in some embodiments.

From the perspective of the present figure, multiple plies of material can again be seen, such as example plies of material 3821, held together and forming a main body 3823 of example knife sheath 3801. At least four (4) such plies of material 3821 can be seen in the present figure. In some embodiments, those at least four plies of material are fastened together, for example, by metal rivets and/or stitching, such as example metal rivet 2825.

What is claimed is:

1. A knife and carrying set, comprising:

a knife;

a knife sheath, configured to hold and guard a blade of said knife, wherein said knife sheath comprises first belt-mounting hardware and a blade-accepting pocket; and a knife sheath adapter, comprising: (a) sheath-interlocking hardware configured to variably interlock with said first belt-mounting hardware of said knife sheath, and (b) additional belt-mounting hardware;

wherein said knife sheath is configured to hold said knife in a generally vertical orientation, perpendicular to a horizontally aligned belt or strap threaded through said first belt-mounting hardware, without using said knife sheath adapter; and wherein the knife sheath adapter is configured to hold said knife not in a vertical orientation, but only in a generally horizontal orientation, parallel to a horizontally aligned belt or strap threaded through said additional belt-mounting hardware, when said sheath-interlocking hardware is interlocked with said first belt-mounting hardware of said knife sheath, and wherein said knife sheath is holding said knife and said blade is inserted in said blade-accepting pocket.

2. The knife and carrying set of claim 1, wherein said knife sheath comprises at least one loop(s) of material, attached to or integral with said blade-accepting pocket, configured to accept one or more belt(s).

3. The knife and carrying set of claim 2, wherein said first belt-mounting hardware comprises said at least one loop(s) of material.

4. The knife and carrying set of claim 1, wherein said knife sheath adapter comprises one or more straps of material.

5. The knife and carrying set of claim 4, wherein said sheath-interlocking hardware comprises one or more straps of material.

6. The knife and carrying set of claim 4, wherein said one or more straps of material comprise at least one sheath pocket section holding strap.

7. The knife and carrying set of claim 5, wherein said one or more straps of material comprise at least one sheath pocket section holding strap.

8. The knife and carrying set of claim 6, wherein said one or more straps of material comprise at least one belt loop engaging strap.

9. The knife and carrying set of claim 7, wherein said one or more straps of material comprise at least one belt loop engaging strap.

10. The knife and carrying set of claim 8, wherein at least one of said at least one belt loop engaging strap comprises reversible fastening hardware configured to fasten and unfasten said belt loop engaging strap to said knife sheath.

11. The knife and carrying set of claim 9, wherein at least one of said at least one belt loop engaging strap comprises reversible fastening hardware configured to fasten and unfasten said belt loop engaging strap to said knife sheath.

12. The knife and carrying set of claim 8, wherein said at least one sheath pocket section holding strap is fixed in place by at least one permanent fastener.

13. The knife and carrying set of claim 9, wherein said at least one sheath pocket section holding strap is fixed in place by at least one permanent fastener.

14. The knife and carrying set of claim 6, wherein an interior surface of said sheath pocket section holding strap is configured to match and conform to an exterior surface of said blade-accepting pocket.

15. The knife and carrying set of claim 7, wherein an interior surface of said sheath pocket section holding strap is configured to match and conform to an exterior surface of said blade-accepting pocket.

16. The knife and carrying set of claim 1, wherein said knife sheath comprises at least one flexible material(s).

17. The knife and carrying set of claim 1, wherein said knife sheath adapter comprises at least one flexible material(s).

18. A method for facilitating the carrying of a knife, comprising the following steps:

providing a knife and carrying set, comprising:

a knife;

a knife sheath, configured to hold and guard a blade of said knife, wherein said knife sheath comprises first belt-mounting hardware and a blade-accepting pocket; and a knife sheath adapter, comprising: (a) sheath-interlocking hardware configured to variably interlock with said first belt-mounting hardware of said knife sheath, and (b) additional belt-mounting hardware;

wherein said knife sheath is configured to hold said knife in a generally vertical orientation, perpendicular to a horizontally aligned belt or strap threaded through said additional belt-mounting hardware, without using said knife sheath adapter; and wherein the knife sheath adapter is configured to hold said knife not in a vertical orientation, but only in a generally horizontal orientation, parallel to a horizontally aligned belt or strap threaded through said first belt-mounting hardware, when said sheath-interlocking hardware is interlocked with said first belt-mounting hardware of said knife sheath, and wherein said knife sheath is holding said knife and said blade is inserted in said blade-accepting pocket.

19. The method for facilitating the carrying of a knife of claim 18, comprising the following additional step:

mounting and carrying said knife in an orientation parallel to said belt.

20. The method for facilitating the carrying of a knife of claim 19, comprising the following additional step:

mounting and carrying said knife in an orientation perpendicular to said belt.

* * * * *